(12) United States Patent
Milster et al.

(10) Patent No.: US 8,003,187 B2
(45) Date of Patent: Aug. 23, 2011

(54) OPTIMIZED MEDIA STRUCTURE FOR BIT-WISE MULTI-LAYER OPTICAL DATA STORAGE

(75) Inventors: Thomas Dean Milster, Tucson, AZ (US); Sang-Ki Park, Tucson, AZ (US)

(73) Assignee: The Arizona Board of Regents on behalf of The University of Arizona, Tucson, AZ (US)

( * ) Notice: Subject to any disclaimer, the term of this patent is extended or adjusted under 35 U.S.C. 154(b) by 754 days.

(21) Appl. No.: 12/081,886

(22) Filed: Apr. 23, 2008

(65) Prior Publication Data

US 2008/0285418 A1 Nov. 20, 2008

Related U.S. Application Data

(60) Provisional application No. 60/925,834, filed on Apr. 23, 2007.

(51) Int. Cl.
B32B 3/02 (2006.01)
(52) U.S. Cl. .................. 428/64.1; 428/64.4; 430/270.12
(58) Field of Classification Search .................. None
See application file for complete search history.

(56) References Cited

U.S. PATENT DOCUMENTS

| 4,788,097 | A | * | 11/1988 | Ohara et al. | 428/201 |
| 5,591,501 | A | * | 1/1997 | Ovshinsky et al. | 428/64.1 |
| 7,842,366 | B2 | * | 11/2010 | Ichimura | 428/64.1 |
| 2006/0262706 | A1 | * | 11/2006 | Wu et al. | 369/112.01 |

* cited by examiner

Primary Examiner — Elizabeth Mulvaney
(74) Attorney, Agent, or Firm — Oblon, Spivak, McClelland, Maier & Neustadt, L.L.P.

(57) ABSTRACT

An optical medium including a plurality of data layers stacked relative to each other in a dielectric medium. A respective data layer including mark and land regions for having information recorded thereon. A mark region and a land region in the respective data layer are disposed beside each other and have substantially the same optical path length across respective thicknesses of the mark region and the land region. A method and computer program product associated with forming the optical medium which determines whether an admittance curve for a material to be used as the mark region forms an intersection with a desired admittance curve based on the admittance of a land region disposed beside the mark region, and determines a thickness of the material based on the intersection.

44 Claims, 34 Drawing Sheets
(9 of 34 Drawing Sheet(s) Filed in Color)

(a) Metal layer on pit structure (b) Single dielectric (c) Two dielectrics (d) Phase change material (e) Metal + single dielectric (f) Metal + two dielectrics (g) Metal + phase change material $$U_T = r_L \cdot \boxed{\bullet\bullet\bullet} + r_M \cdot \blacksquare$$

$$= r_L \cdot \left\{ \boxed{\phantom{xxx}} - \blacksquare \right\} + r_M \cdot \blacksquare$$

$$= r_L \cdot \underbrace{\boxed{\phantom{xxx}}}_{U_F} + (r_M - r_L) \cdot \underbrace{\blacksquare}_{U_M}$$

FIG. 3

(a) Case 1: In-focus layer above crosstalk layer (b) Case 2: Crosstalk layer above in-focus layer (a) Coherent case (b) Incoherent case Δz = 5 μm, Coherent Source Δz = 5 μm, Incoherent Source Δz = 7.5 μm, Coherent Source Δz = 7.5 μm, Incoherent Source Δz = 10 μm, Coherent Source Δz = 10 μm, Incoherent Source Δz = 12.5 μm, Coherent Source Δz = 12.5 μm, Incoherent Source Δz = 15 μm, Coherent Source Δz = 15 μm, Incoherent Source (a) Case with solution (b) Case without solution (a) Metal layer on pit structure (b) Single dielectric (c) Two dielectrics (d) Phase change material (e) Metal + single dielectric (f) Metal + two dielectrics (g) Metal + phase change material $$n_0 = 1.601$$

| $n_1$ | $n_2$ | $n_1$ | $n_2$ | $n_1$ | $n_2$ | $n_1$ |

| $n_A$ | $n_C$ | $n_A$ | $n_C$ |
| $n_1 + ik_1$ | $n_2 + ik_2$ | $n_1 + ik_1$ | $n_2 + ik_2$ |

(a) Admittance diagram  (b) Parameters vs. layer thickness (a) Admittance diagram    (b) Parameters vs. layer thickness Mark     Land $n_0 = 1.601$

| ITO | Bi$_2$O$_3$ |
|---|---|
| 2.015+0.016j | 1.91 |
| Silver, 0.05+2.1j | |

UV resin,  $n_0 = 1.601$

FIG. 24

(a) Admittance diagram  (b) Parameters vs. layer thickness

OPTIMIZED MEDIA STRUCTURE FOR BIT-WISE MULTI-LAYER OPTICAL DATA STORAGE

CROSS REFERENCE TO RELATED APPLICATIONS

This application is related to and claims priority under 35 U.S.C. §119(e) to U.S. Ser. No. 60/925,834, entitled "OPTIMIZED MEDIA STRUCTURE FOR BIT-WISE MULTI-LAYER OPTICAL DATA STORAGE" filed Apr. 23, 2007, the entire contents of which are incorporated herein by reference.

BACKGROUND OF THE INVENTION

1. Field of the Invention

The present invention relates to a bit-wise optical data storage structure and method for writing and reading.

2. Discussion of the Related Art

Capacities of commercial optical data storage systems have increased due to increasing demand. One way to increase capacity is to stack multiple layers on a single disc. Using a multiple layered-system is very attractive, because the system capacity can be increased by a factor equal to the number of layers.

Several multiple-layer data storage technologies are under investigation. For example, dual-layer recording is now at a practical engineering stage for system development in several formats, such as DVD and BD, and performance of systems using more than two conventional reflective layers for BD has been reported. Performance of systems using two-photon fluorescent media with 100's of layers is understood, but these systems exhibit low readout data rate with a single beam optical pickup. It is known that the number of layers using conventional thin-film technology is mainly limited by layer transmittance.

Conventional thin-film technology is used to optimize recording layers in single-layer and dual-layer optical discs. Extension of this technology to a many-layered disc requires special considerations. For example, each layer must reflect some amount of light in order to provide a readout signal. A deep layer suffers from decreased illumination, due to reflection losses from other layers above it. In order to write data, the layer must be exposed with at least the threshold irradiance level. Since the maximum laser power available from the source is fixed, the maximum number of layers is determined by the deepest layer that has adequate irradiance for writing. The laser power reaching the j-th layer is $$P_j = P_L T^j \quad (1)$$

where $P_L$ is total laser power incident to the disc and T is layer transmittance. In order to write data on each layer, the laser power must be greater than the threshold irradiance $I_{th}$. Thus, irradiance of the laser spot on layer j should be larger than $I_{th}$, which is mathematically expressed as $$\frac{P_j}{s^2} \geq I_{th}, \quad (2)$$

where s is spot diameter, $$s = \frac{\lambda}{NA}. \quad (3)$$

By substituting Equation (1) into Equation (2) and using the equality, the maximum number of layers N is given as $$N = \frac{\log(s^2 I_{th}/P_L)}{\log T}. \quad (4)$$

A plot of the maximum number of layers N versus the transmittance T of each layer is shown in FIG. 1 for the far-field Blu-ray disc (BD) optical system parameters.

FIG. 1 shows a maximum number of layers N versus layer transmittance T for conventional thin-film multi-layer system, when no absorption is assumed. The number of layers is limited by the laser power and the threshold writing irradiance. Parameters for far-filed system are for a BD system. In FIG. 1, the laser power, threshold irradiance, and wavelength are 100 mW, 5 mW/μm², and 405 nm, respectively ($P_L$=100 mW, $I_{th}$=5 mW/μm², and λ=405 nm). The near-field curve is generated using NA=1.2. For example, if each layer provides 60% transmission, the total number of layers is limited to about 10. The total capacity of a 10-layer BD would be about 250 Gbyte. Ichimura et al. ("Proposal for a multilayer read-only-memory optical disk structure," *Applied Optics*, 45: 1794-1803) has demonstrated an eight-layer BD-like structure by utilizing different reflectivities at each of the layers. Other considerations, like inter-layer crosstalk, which is the ratio of signal strength detected from out-of-focus layers to the signal strength detected from the in-focus (desired) layer, are also important for determining layer design of a multi-layer thin-film disc. Even if individual layers are electronically addressable, there is a residual reflection at each layer that limits the total number of layers.

To date, characteristics and limitations of extending conventional thin-film recording technology using multiple layers have not been extensively investigated and therefore are not well understood.

BRIEF DESCRIPTION OF THE DRAWINGS

The patent or application file contains at least one drawing executed in color. Copies of this patent or patent application publication with color drawing(s) will be provided by the Office upon request and payment of the necessary fee. A more complete appreciation of the invention and many of the attendant advantages thereof will be readily obtained as the same becomes better understood by reference to the following detailed description when considered in connection with the accompanying drawings, wherein:

FIG. 3 shows an application of Babinet's principle for a data layer;

FIG. 19 shows a geometry of two dielectric layers according to an embodiment of the invention;

FIG. 20 shows a phase change material geometry according to an embodiment of the invention;

FIG. 24 shows a geometry of metal and two dielectric layers according to an embodiment of the invention;

DETAILED DESCRIPTION OF THE INVENTION

Figure 1:
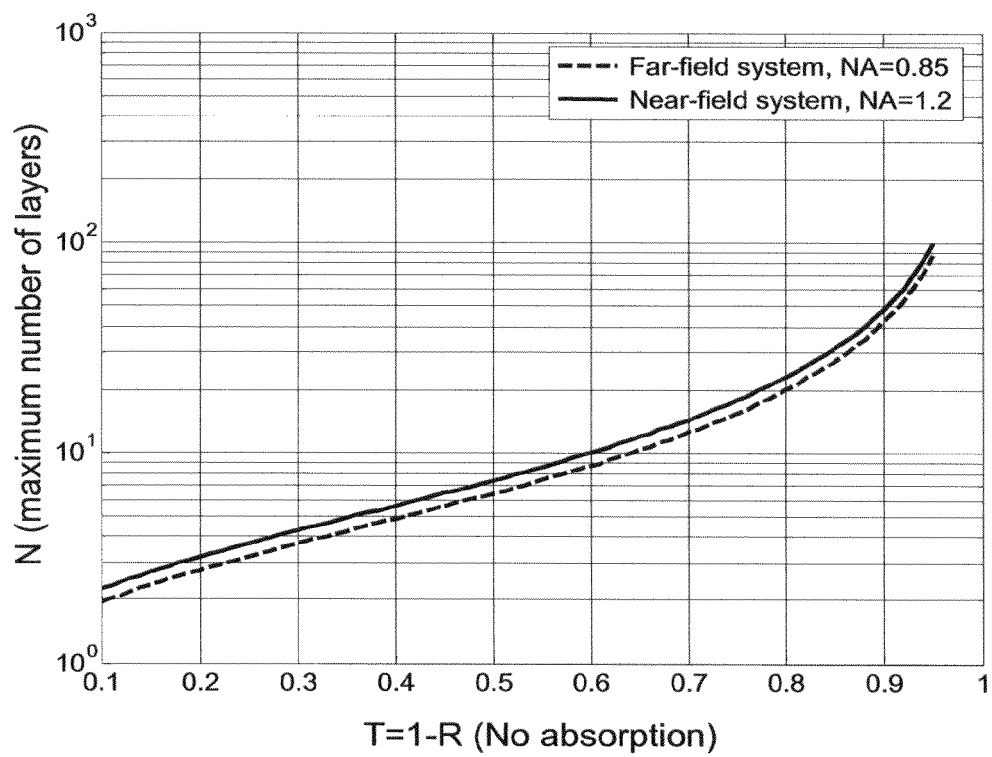
FIG. 1 is a plot of a maximum number of layers of a medium versus the transmittance.

Referring now to the drawings, wherein like reference numerals designate identical, or corresponding parts throughout the several views.

Figure 2A:
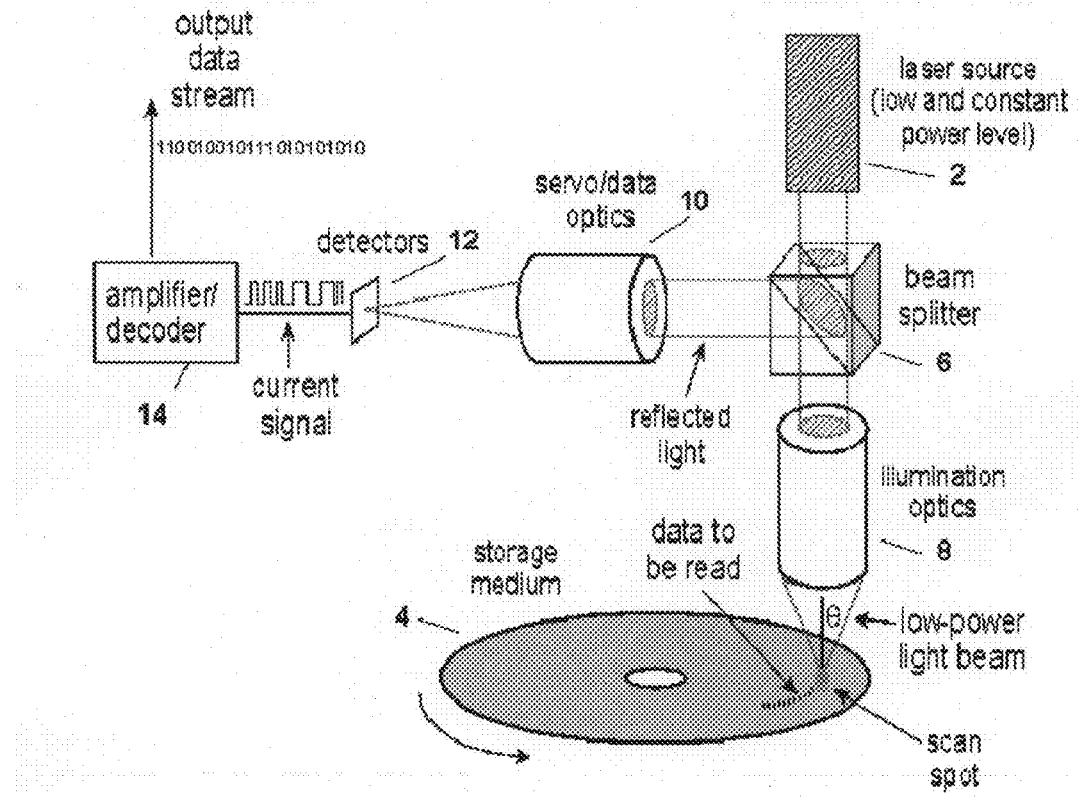
FIG. 2A is a schematic diagram of an optical read/write system.

Optical data storage systems use light to write and read information. A schematic of typical read/write system is shown in FIG. 2A. The system includes laser source 2, storage medium 4, beam splitter 6, illumination optics 8, servo/data optics 10, detectors 12, and amplifier/decoder 14. In a reading process, a low-power laser beam from laser source 2 scans a data pattern on spinning storage medium 4, which may be a compact disk (CD). A reflected signal is directed with a beam splitter 6 to detectors 12. Detectors 12 produce a current signal, which is then decoded into user data. In a writing process, a higher power laser beam from source 2 writes a data pattern on spinning disk 4.

In the writing process, an input stream of digital information is converted with an encoder and a modulator (not shown) into an analog current drive signal for the laser. The '1's in the drive signal switch the laser diode on and off alternatively. The intense light beam from the laser, when focused on the rotating scanning disc surface through the illumination optics, heats up the disc surface at the focused spot. The reflective property of the data layer at these regions is changed once the temperature goes beyond a threshold level. In this way, data are written on a spiral track around the center of the optical disc with alternating data marks and lands.

In the readout process, the laser is typically operated at a low, constant output power level that does not heat the medium, so that reflection is not affected by the laser beam. As the disc rotates, the reflected light is modulated upon reflection from the recorded data marks. The reflected light is then directed to detectors through servo/data optics and converted into an electrical detector current.

Figure 2B:
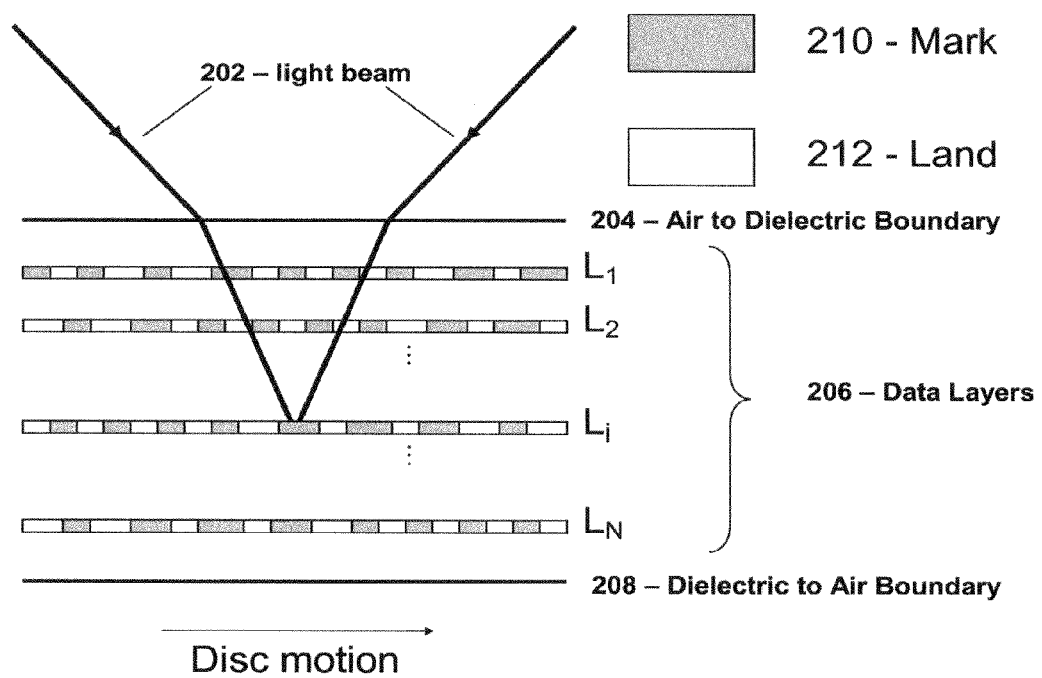
FIG. 2B shows an optical medium with a plurality of data layers according to an embodiment of the invention.

FIG. 2B shows an embodiment of the invention with an optical medium that includes a plurality of data layers 206 ($L_1$-$L_N$) stacked relative to each other in a dielectric medium that has boundaries 204 and 208 with air. Light beam 202 is incident on the optical medium. A data layer includes mark 210 and land regions 212 for having information recorded thereon. A mark region and a land region in the respective data layer are disposed beside each other and have substantially the same optical path length across respective thicknesses of the mark region and the land region. Substantially the same optical path length is achieved, for example, when the path length difference is less than approximately one twentieth of the illumination wavelength.

In another embodiment of the invention, the individual data layers shown in FIG. 2B may have substantially the same reflectivity as each other. According to this embodiment, land materials including land regions of respective data layers have substantially the same reflectivity, and mark materials including the mark regions of the respective data layers having substantially the same reflectivity. This differs from the optical medium described by Ichimura et al. which uses different reflectivities for each of a plurality of data layers. There is also an embodiment of the invention where the data layers shown in FIG. 2B may have substantially the same transmittance as each other. In one embodiment, there may be a reflectivity of a respective data layer of at least 5%, 10%, or 15%. Other reflectivity values are possible.

In another embodiment, there may be groups of at least 5 data layers as a number of data layers with substantially the same reflectivity. An upper group A of at least five layers having reflectivity $R_A$ may be formed on top of a lower group B of at least five layers having reflectivity $R_B$. Groups A and B may be followed underneath by other groups of data layers having reflectivity $R_C$, $R_D$, etc. Therefore, in FIG. 2B, a group of data layers $L_1$-$L_5$ may be an upper group having a same reflectivity and a group of data layers $L_6$-$L_{10}$ may be a lower group having a same reflectivity. The properties of the data layers in the above-described groups are similar to those data layers described in the below description.

In an embodiment of the invention, a data layer includes at least two sub-layers. In one example, a data layer may include a sublayer of a metallic material. In one example, the data layer may include within a sub-layer a dielectric medium as a land region and a metallic oxide as a mark region. In one example, in one sub-layer the metallic oxide medium may be indium tin oxide and another sub-layer may be silver. In this example, the indium tin oxide may be approximately 28 nm and the silver sub-layer may be 9 nm; however the invention is not limited to these numbers.

According to different embodiments of the invention, a data layer may have a transmittance of either 70%, 80%, or 90%. Other transmittances are possible. According to different embodiments of the invention, there may be at least 5, 20, or 40 data layers as the number of data layers. As discussed below, the number of layers will depend on a number of factors such as the phase preservation across each data layer. In one aspect of the invention, the phase of the light leaving the land "matches" the phase of the light leaving the mark. This condition is made possible by an optical path difference such that the phase across the mark side (or viewed alternatively the phase across the land) has changed relative to the land by less than 20 degrees.

In one embodiment of the invention, there is an optical medium including a plurality of data layers stacked relative to each other in a dielectric medium. A respective data layer has mark and land regions for having information recorded on it. The mark and land regions include a material that exhibits an admittance curve (discussed in detail below) that intersects a desired admittance curve for minimizing crosstalk between the plurality of data layers. A thickness of the material is determined by an intersection of the admittance curve of the material and the desired admittance curve.

In an embodiment of the invention, there is a method of determining a composition of a data layer for an optical medium that includes a plurality of data layers stacked relative to each other in a dielectric medium. The method includes determining whether an admittance curve for a material to be used as the mark region forms an intersection with a desired admittance curve of an ideal minimum crosstalk mark. The method also includes determining a thickness of the material (and hence a thickness of the land or mark) based on the intersection.

In an embodiment of the invention, the desired admittance satisfies a condition of $$Y_{MD} = \frac{(1+\beta e^{i\phi})Y_L + (1-\beta e^{i\phi})n_0}{(1-\beta e^{i\phi})Y_L + (1+\beta e^{i\phi})n_0} \cdot n_0$$

where $Y_L$ is the admittance of one of the land regions besides said one of the mark regions, $\beta$ is a scaling parameter ratio of mark reflection with to land reflection, $\phi$ is total phase of a mark in reflection compared to that of a land, and $n_0$ is the refractive index of the dielectric medium.

In different examples, the separation between data layers is either 10 μm or 15 μm for coherent illumination or either 10 μm or 12.5 μm for incoherent illumination. In one embodiment, the inter-layer spacing set to a distance which minimizes crosstalk between data layers. For example, the inter-layer spacing may be 10 μm, for which $\beta$ is set to 0.7 and $\phi$ is 60 degrees. Variations in $\beta$ and $\phi$ are described below.

Figure 2C:
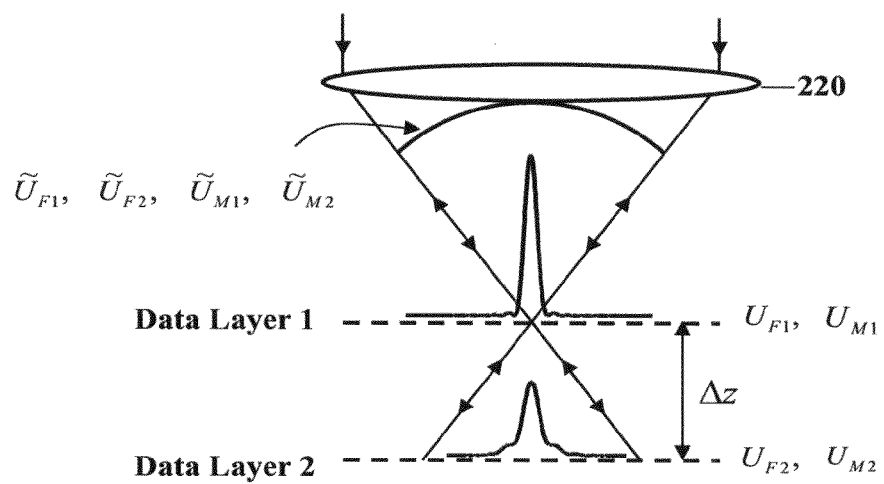
FIG. 2C is a two-layer diffraction model for inter-layer crosstalk.

Additional description of embodiments of the invention follows.
Inter-Layer Crosstalk FIG. 2C illustrates a two-layer diffraction model for inter-layer crosstalk. The objective lens 220 focuses incident light onto data layer 1 and illuminates data layer 2 with defocus Δz. Each data layer is considered a thin object that changes both the amplitude and the phase of the reflected light. The field reflected from each layer is decomposed into two components by Babinet's principle, and the two components can be considered to propagate back to a reference sphere of the objective lens. Consequently, the components are interferometrically recombined to form the desired signal and different types of crosstalk from layers not directly being imaged.
Application of Babinet's Principle The following analysis is provided not to limit the invention but rather to provide one a better understanding of the invention and its various embodiments. The optical system used in the simulation of the invention has a numerical aperture of 0.85 and a laser wavelength of 405 nm. A Gaussian-weighted irradiance distribution is assumed at the entrance pupil of the objective lens. The incident light is focused onto the in-focus layer, which is data layer 1 in FIG. 2. Data layer 2, which is the crosstalk layer, is illuminated by a defocused spot distribution. Thus, two layers are illuminated.

One principle in the following analysis is that data layer 1 does not affect the distribution of the transmitted laser beam at focus. The influence of out-of-focus layers is a function of the phase of the transmitted light through the data marks compared to the phase transmitted through the land areas. If the transmitted phase is a multiple of 360°, the disturbance to the in-focus spot is minimal.

FIG. 3 shows a simple application of Babinet's principle for a single data layer, according to Babinet's principle. In FIG. 3, Babinet's principle is used to decompose the fields reflected from each data layer into components such that UM is reflection from the mark, and UF is flat-media reflection. Both are modulated by the field distribution at each layer. The total reflection from each data layer is written as $$U_{T1} = r_{L1}U_{F1} + (r_{M1} - r_{L1}) \cdot U_{M1} = r_{L1}U_{F1} + \Delta r_1 U_{M1}$$

$$U_{T2} = r_{L2}U_{F2} + (r_{M2} - r_{L2}) \cdot U_{M1} = r_{L2}U_{F1} + \Delta r_2 U_{M1} \quad (5)$$

where $r_{L1}$ and $r_{L2}$ are complex coefficients of reflection from land areas in layers 1 and 2, respectively, and $r_{M1}$ and $r_{M2}$ are complex coefficients of reflection from the mark areas in layers 1 and 2, respectively. $U_{F1}$ and $U_{F2}$ are flat-media reflections, and $U_{M1}$ and $U_{M2}$ are reflections from data marks. Thus, the total reflected field from each layer can be decomposed into two components, which are the flat-media reflection and the reflection from data marks. Field components are modulated by the illumination field distribution at each layer.

Figure 4:
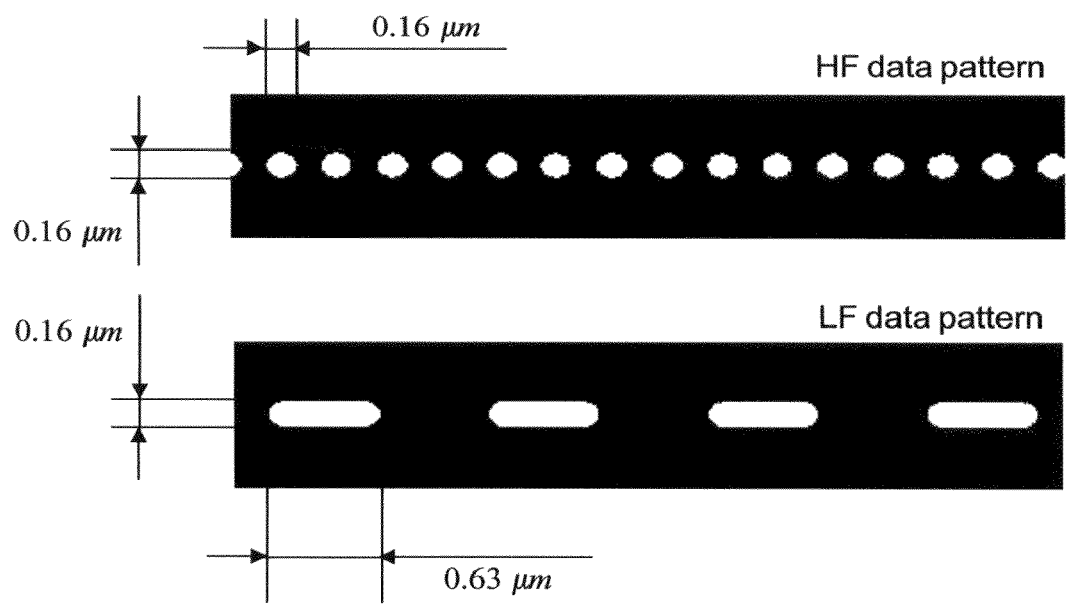
FIG. 4 shows BD-like data mark patterns.

Two kinds of BD-like data mark patterns are used for the simulation as shown in FIG. 4. One is a high-frequency pattern, and the other is low-frequency pattern. The mark shape of the high-frequency pattern is a 0.16 μm diameter circle. The low-frequency pattern mark shape is a rectangle with circular ends. Its width is 0.16 μm, and its length is 0.63 μm. The duty cycle is 50% for both patterns. The reflective characteristics of both layers are equal.

Figure 5:
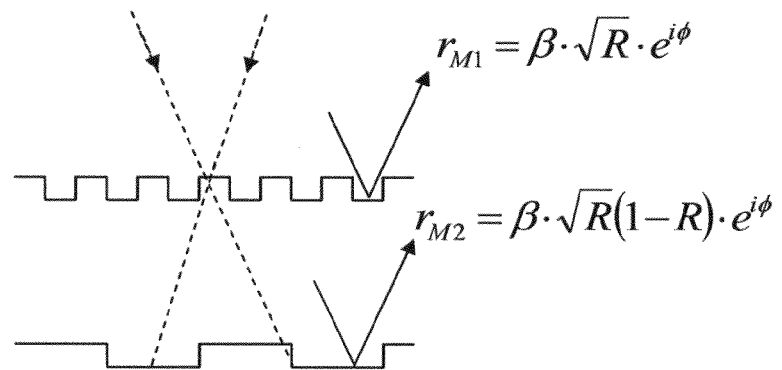
FIG. 5 shows different cases for a crosstalk layer in an optical medium.
Figure 5:
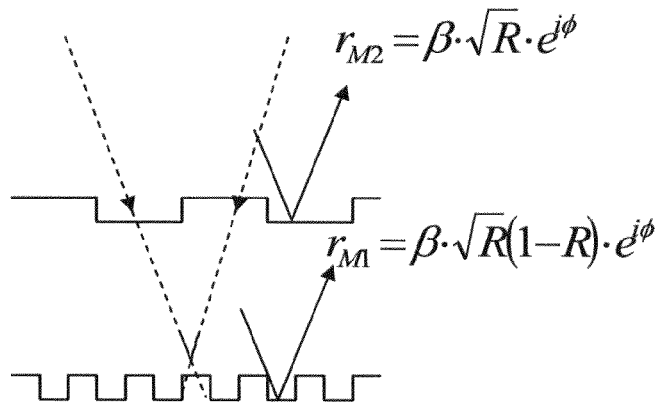

Two cases are considered in the simulation of the invention, as shown in FIG. 5. In case 1 shown in FIG. 5(a), the light is focused on the top layer, and in case 2 shown in FIG. 5(b), light is focused on the bottom layer. R is reflectivity of the land area in both layers, $\beta$ is a scaling parameter for the mark reflection with respect to land reflection, and $\phi$ is total phase of the mark in reflection compared to that of the land.

Any linear operation on the total field is a summation of linear operations performed on its individual components. Therefore, total fields, which propagate from each layer back to the reference sphere, can be written as $$\tilde{U}_{T1} = r_{L1}\tilde{U}_{F1} + (r_{M1} - r_{L1})\tilde{U}_{M1} = r_{L1}\tilde{U}_{F1} + \Delta r_1 \tilde{U}_{M1}$$

$$\tilde{U}_{T2} = r_{L2}\tilde{U}_{F2} + (r_{M2} - r_{L2})\tilde{U}_{M1} = r_{L2}\tilde{U}_{F1} + \Delta r_2 \tilde{U}_{M1} \quad (6)$$

where the tilde represents the linear operation of propagation.
Formation of Signal and Crosstalk Terms The total fields reflected from the two layers are recombined on, for example, a reference sphere. In the coherent case, like when a laser diode is used as a light source, the total irradiance I can be written as $$I = |\tilde{U}_{T1} + \tilde{U}_{T2}|^2 \quad (7)$$

Figure 6:
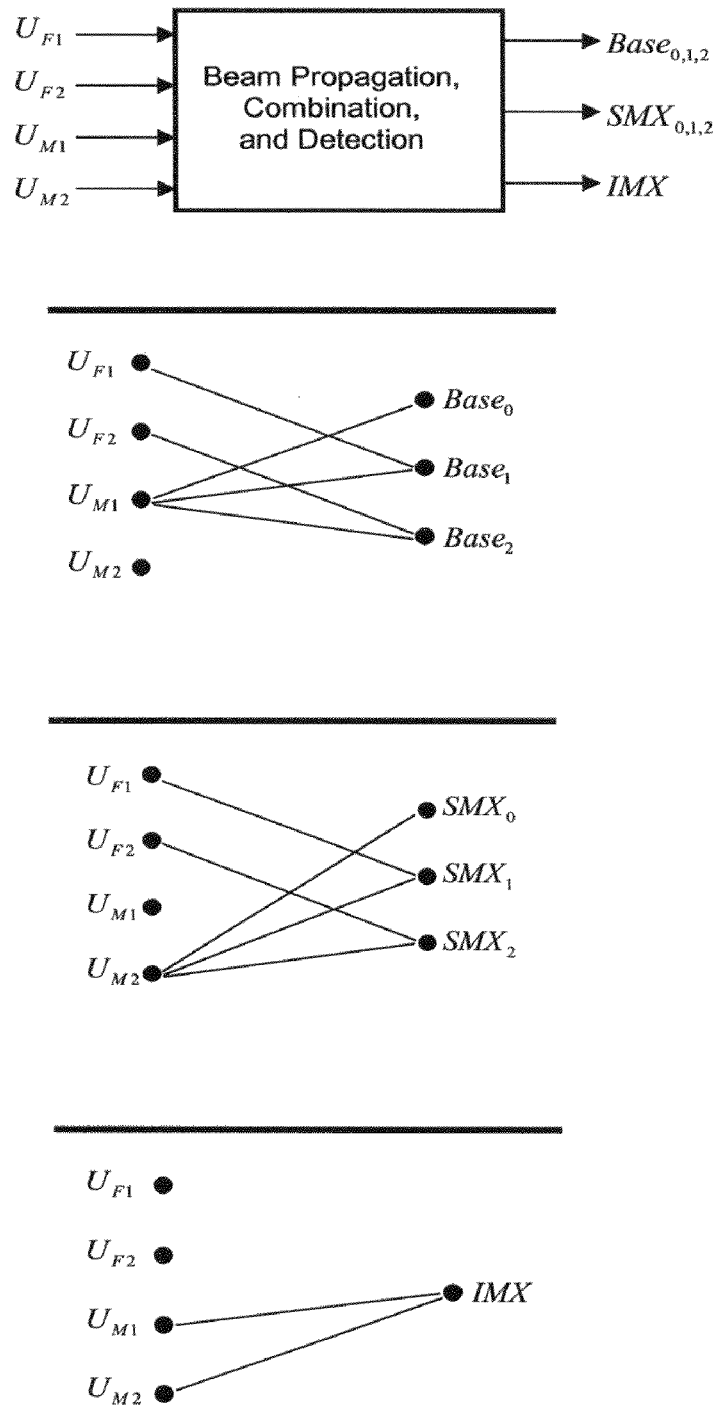
FIG. 6 shows signal groups for classifying irradiance that results when light is reflected off of different data layers.

The resulting irradiance is classified into three meaningful signal groups, as shown in FIG. 6 and Table 1. Base is the desired data signal group from the in-focus layer. Single-modulation crosstalk (SMX) is an unwanted signal group from the crosstalk layer, and inter-modulation crosstalk (IMX) is the interference between data mark reflections from the two layers. SMX and IMX together form the total crosstalk signal.

If a temporally incoherent source, like a super-luminescent diode, is used as a light source, the total irradiance I can be written as $$I = |\tilde{U}_{T1}|^2 + |\tilde{U}_{T2}|^2. \tag{8}$$

Table 1 can also be applied for the incoherent case, except there are no $Base_2$, $SMX_1$, and IMX terms, because the fields reflected from different layers do not interfere with each other.

TABLE 1

Formation of Signal and Crosstalk.

| Coherent case | Incoherent case |
|---|---|
| $I = |\tilde{U}_{T1} + \tilde{U}_{T2}|^2$ | $I = |\tilde{U}_{T1}|^2 + |\tilde{U}_{T2}|^2$ |
| DC Offset = $|r_1\tilde{U}_{F1} + r_2\tilde{U}_{F2}|^2$ | DC Offset = $|r_1\tilde{U}_{F1}|^2 + |r_2\tilde{U}_{F2}|^2$ |
| $Base_0 = |\Delta r_1 \tilde{U}_{M1}|^2$ | $Base_0 = |\Delta r_1 \tilde{U}_{M1}|^2$ |
| $Base_1 = 2 \cdot Re\{r_1\Delta r_1^* \tilde{U}_{F1}\tilde{U}_{M1}^*\}$ | $Base_1 = 2 \cdot Re\{r_1\Delta r_1^* \tilde{U}_{F1}\tilde{U}_{M1}^*\}$ |
| $Base_2 = 2 \cdot Re\{r_2\Delta r_1^* \tilde{U}_{F2}\tilde{U}_{M1}^*\}$ | No $Base_2$ |
| $SMX_0 = |\Delta r_2 \tilde{U}_{M2}|^2$ | $SMX_0 = |\Delta r_2 \tilde{U}_{M2}|^2$ |
| $SMX_1 = 2 \cdot Re\{r_1\Delta r_2^* \tilde{U}_{F1}\tilde{U}_{M2}^*\}$ | No $SMX_1$ |
| $SMX_2 = 2 \cdot Re\{r_2\Delta r_2^* \tilde{U}_{F2}\tilde{U}_{M2}^*\}$ | $SMX_2 = 2 \cdot Re\{r_2\Delta r_2^* \tilde{U}_{F2}\tilde{U}_{M2}^*\}$ |
| $IMX = 2 \cdot Re\{\Delta r_1\Delta r_2^* \tilde{U}_{M1}\tilde{U}_{M2}^*\}$ | No IMX |
| Signal = $Base_0 + Base_1 + Base_2$ | Signal = $Base_0 + Base_1$ |
| Crosstalk = $SMX_0 + SMX_1 + SMX_2 + IMX$ | Crosstalk = $SMX_0 + SMX_2$ |

With either coherent or incoherent illumination, the total crosstalk X can be expressed as $$X = 20\log_{10}\frac{I_B}{I_A}, \tag{9}$$

where $I_A$ and $I_B$ are the peak-to-valley currents of Signal and Crosstalk, respectively, when the disc is scanned.

Piece-Wise Propagation

Figure 7:
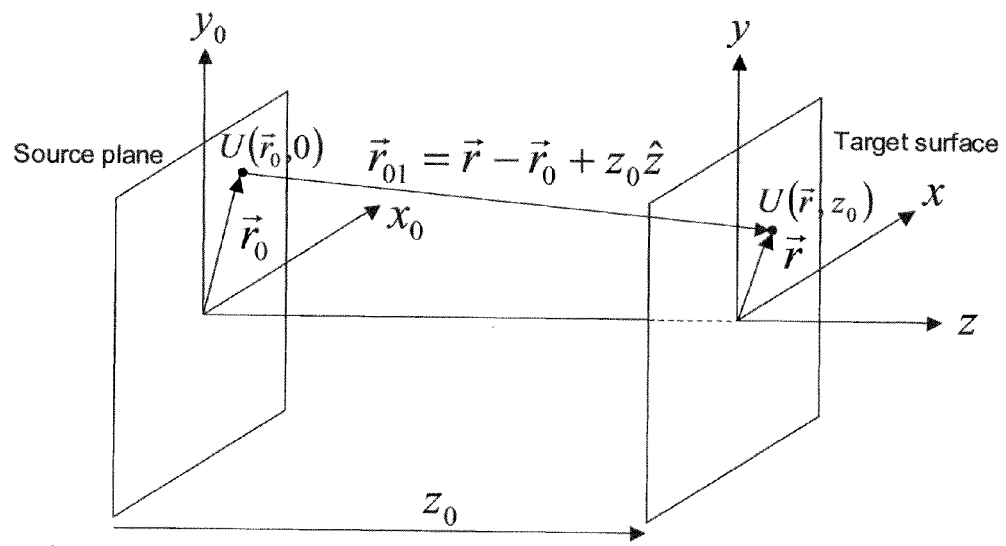
FIG. 7 is a schematic diagram of piece-wise propagation.

The field distribution at the exact focus can be calculated from Fourier transformation of a Gaussian distribution at the entrance pupil of the objective lens. All other propagated fields in the simulation of the invention are calculated by a piece-wise propagation method, which is a discrete form of Huygens's principle. FIG. 7 shows the schematic diagram of piece-wise propagation where $U(\vec{r}_0, 0)$ and $U(\vec{r}_0, z_0)$ are field distributions on source plane and target surface, respectively. $z_0$ is the propagation distance. All field elements on the source plane are considered as point sources. The point spread function (PSF) can be expressed as $$PSF = \frac{\lambda\gamma}{ir_{01}}\exp\left(i\frac{2\pi r_{01}}{\lambda}\right), \tag{10}$$

where λ is wavelength, γ is the obliquity factor, which is $$\gamma = \frac{z_0}{r_{01}}, \tag{11}$$

and $r_{01}$ is given by $$r_{01} = |\vec{r} - \vec{r}_0 + z_0\hat{z}|, \tag{12}$$

where $z_0$ is the propagation distance. Then, the field at a point on the target surface can be expressed as $$U(\vec{r}, z_0) = \int U(\vec{r}_0, 0)PSF dx_0 dy_0 \tag{13}$$
$$= \int U(\vec{r}_0, 0)\frac{\lambda\gamma}{ir_{01}}\exp\left(i\frac{2\pi r_{01}}{\lambda}\right)dx_0 dy_0.$$

When an out-of-focus field distribution that is defocused by Δz, as shown in FIG. 2, is calculated, the target surface is considered to be flat. When any field distribution on reference sphere reflected from data layers is calculated, the target surface is considered to be a sphere.

Figure 8:
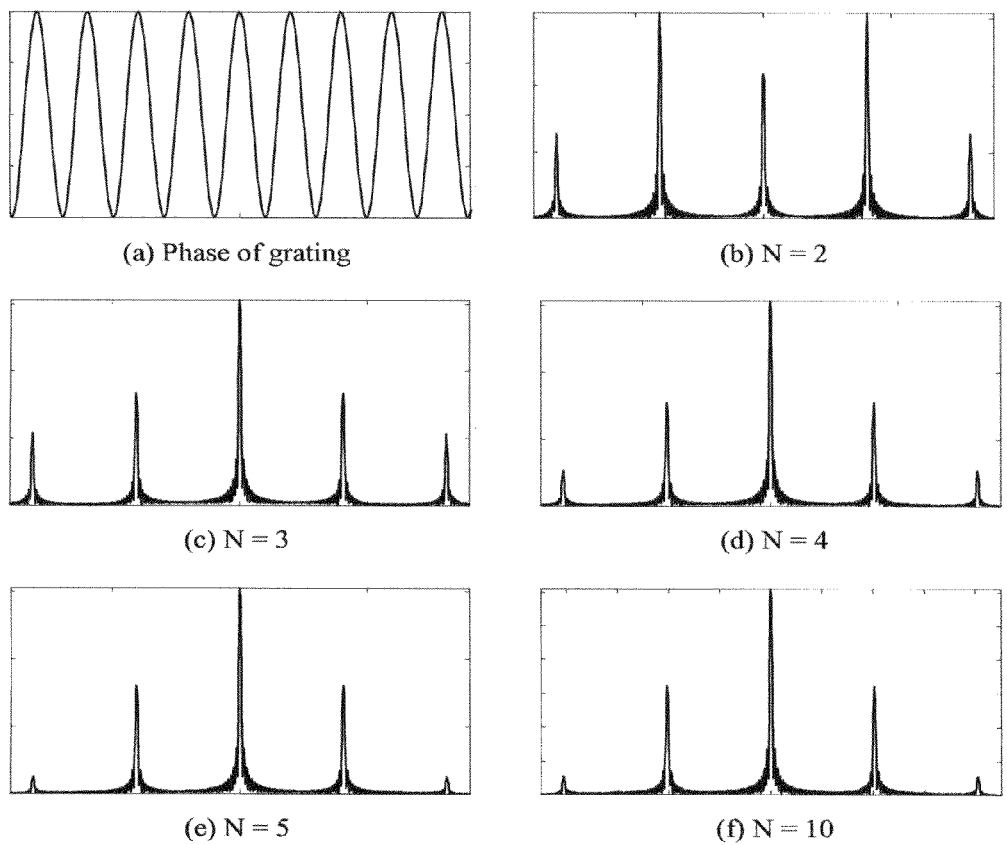
FIG. 8 shows far-field diffraction patterns.

Selection of the number of sampling points on the source plane is critical in this calculation. For example, FIG. 8 shows far-field diffraction patterns from a grating with sinusoidal phase and uniform amplitude when collimated monochromatic light is incident. The phase of the grating is shown in FIG. 8(a), and diffraction patterns calculated with different sampling numbers are shown in FIG. 8(b)-(f). According to the Nyquist theorem, at least two sampling points in a single period are required to resolve a pattern. However, two sampling points in a single period are not enough to generate the proper profile of a propagated field, as shown in FIG. 8(b). Two sampling points in a single period produce a pattern that is just barely resolved. It is known that at least three points in a single period are required to generate the proper profile of the propagated field, and five points in a single period increases the fidelity of the higher diffraction orders, as shown in FIG. 8. Therefore, the total number of sampling points on the source plane should be large enough to include more than three sampling points in a single data mark in the HF data pattern shown in FIG. 4. Also, the total number and distribution of sampling points in the source plane preferably would be large enough to maintain the phase change between sampled field elements at two adjacent pixels smaller than 2π/3.

The matrix size of the data patterns is biggest at Δz=15 μm, which is 52×9733 pixels. The required dynamic storage capacity is 8 MB. The computer used in this calculation is equipped with an AMD Athlon 64-bit processor with a 2.4 GHz clock, 2 GB memory, and the Windows operating system. Undisturbed calculation time required to get a single field distribution on the reference sphere at Δz=15 μm is 3 hours, and there are 41 translated data patterns involved in the calculation. Therefore, it takes 123 hours (over 5 days) to complete all calculations at Δz=15 μm. The total calculation at every Δz takes more than two weeks. This large calculation time is one reason that scalar calculations are typically used instead of vector calculations. The invention is not limited to these specific examples.

Computational Results

Figure 9:
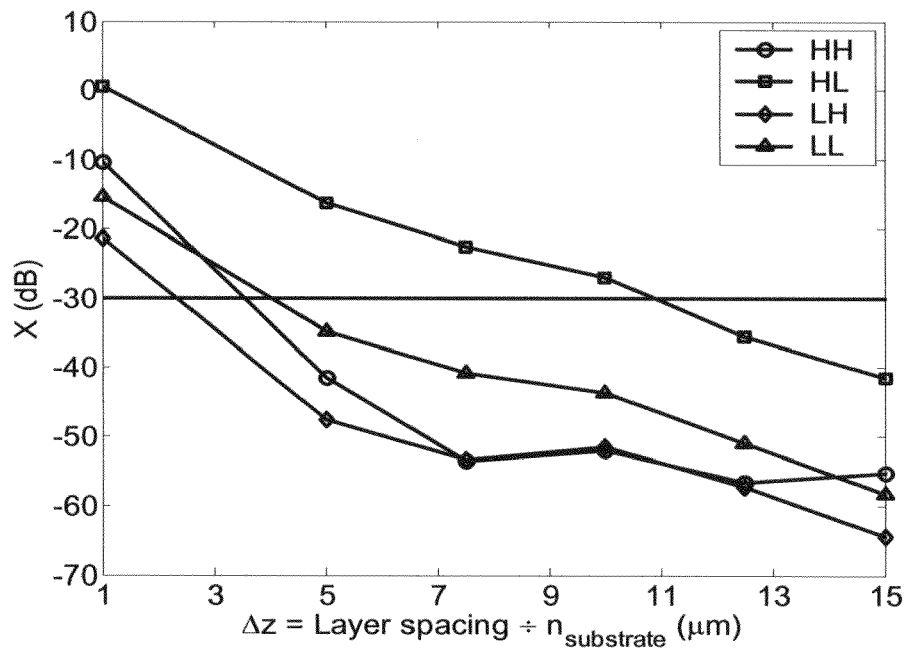
FIG. 9 shows a plot of total crosstalk with respect to normalized layer spacing for coherent and incoherent sources.
Figure 9:
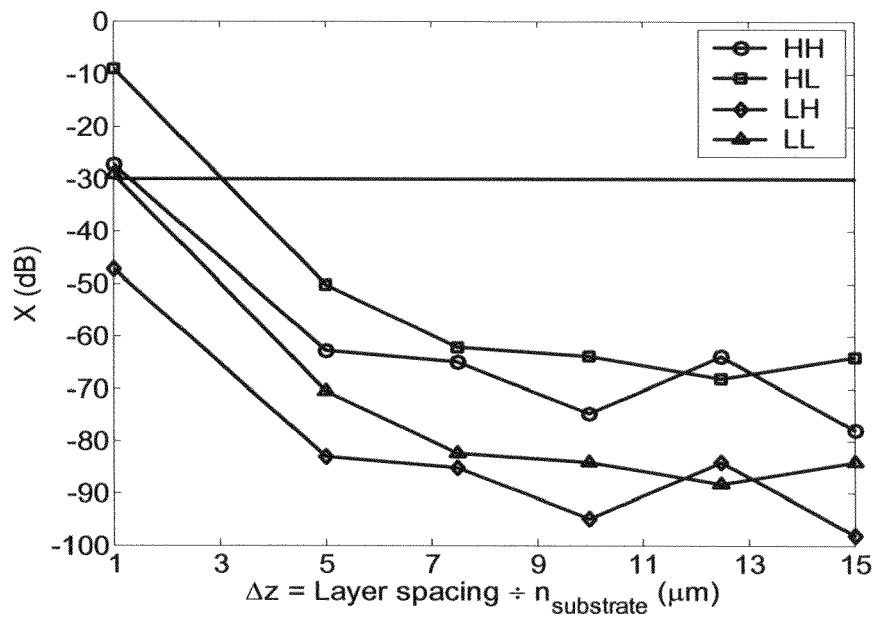

FIG. 9 shows the total crosstalk X with respect to normalized layer spacing, when the top layer is the in-focus layer (Case 1). FIG. 9 shows total crosstalk X versus normalized layer spacing (Case 1, R=30%, β=0.6, and φ=π). R is the reflectivity of a land region, β is the absolute value of the ratio of amplitude reflection coefficient of data mark area to that of land area, and φ is the phase difference between land and mark areas for reflected fields. The letters H and L in the legend represent the high-frequency pattern and the low-frequency pattern, respectively. The first letter represents the top layer, and second letter represents the bottom layer.

The parameters, R, β, and φ are 0.3, 0.6, and π, respectively. The normalized layer spacing is defined herein as the physical layer spacing divided by the refractive index of the substrate. The letters, H and L in the legend represent the high-frequency pattern and the low-frequency pattern, respectively. The first letter represents the top layer, and second letter represents the bottom layer. For example, HL is a situation where the high-frequency pattern is on top, and the low-frequency pattern is on the bottom. The dotted line at X=−30 dB is the criterion for acceptable inter-layer crosstalk. For coherent illumination shown in FIG. 9(a), crosstalk decreases with increasing layer spacing, and X becomes lower than −30 dB regardless of geometry when the normalized layer spacing is larger than 11 µm. The worst geometry is HL. The low-frequency pattern, which is the crosstalk layer in this case, reflects more light than the high-frequency pattern to form stronger crosstalk terms. The high-frequency pattern reflects less light than the low-frequency pattern to form a weaker signal.

For incoherent illumination shown in FIG. 9(b), crosstalk also gradually decreases with increasing layer spacing. Data sets HL and LL produce similar, but offset, values because there are no IMX terms. The same observation is made for HH and LH. X is much lower for all geometries than with coherent illumination, and it becomes lower than −30 dB regardless of geometry when normalized layer spacing is larger than 3 µm. The worst geometry is HL.

Figure 10:
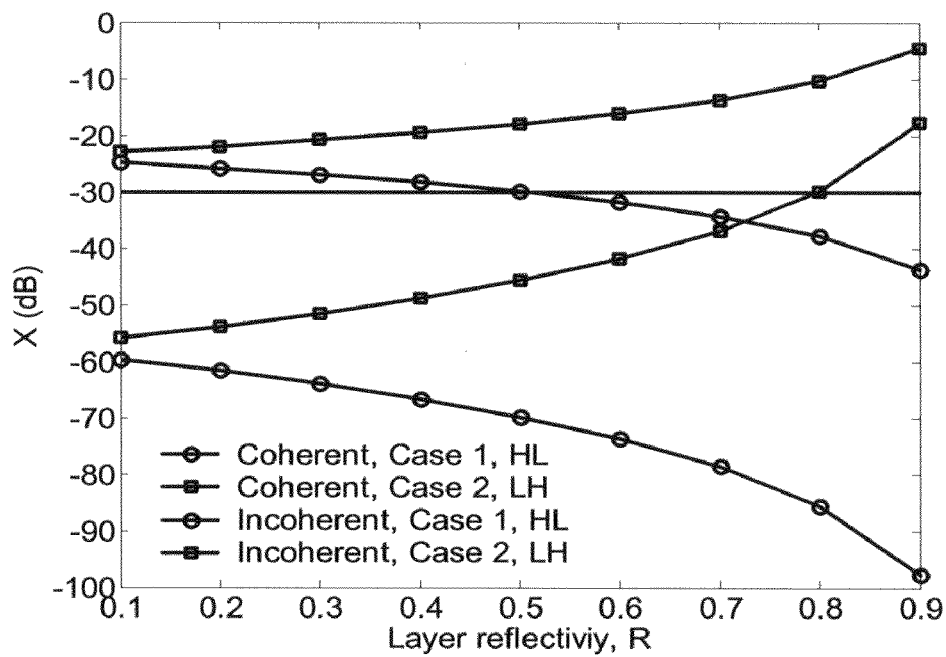
FIG. 10 shows a plot of total crosstalk versus layer reflectivity.
Figure 11A:
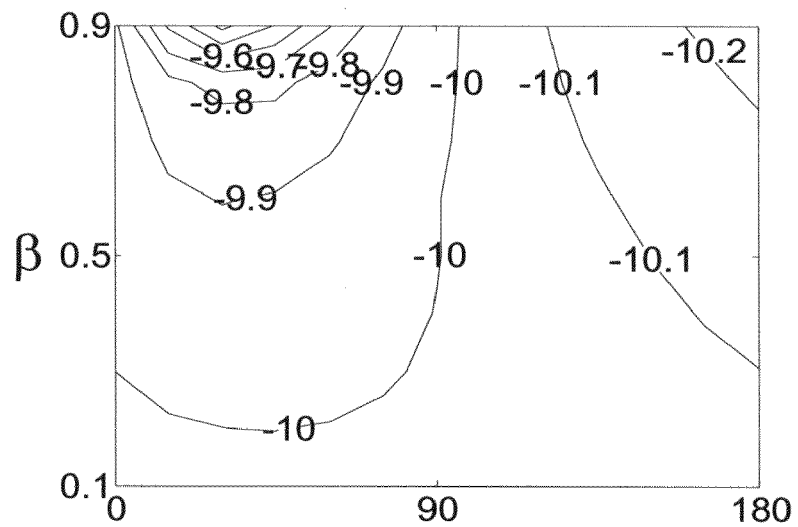
FIGS. 11A-11E show contour maps of β vs. φ for total cross-talk at several layer spacings.
Figure 11A:
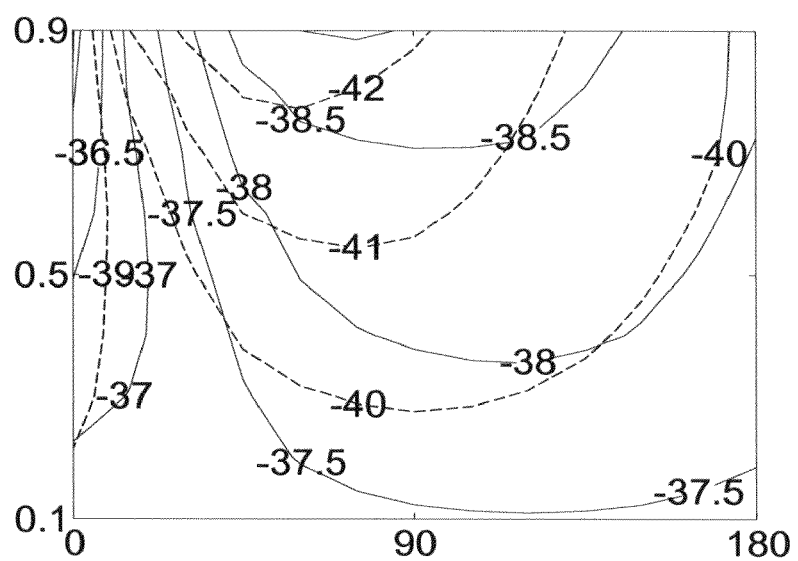
Figure 11B:
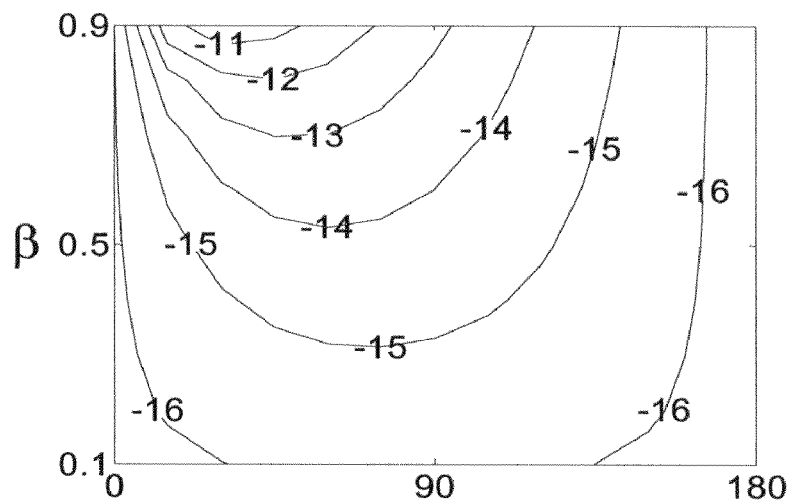
Figure 11B:
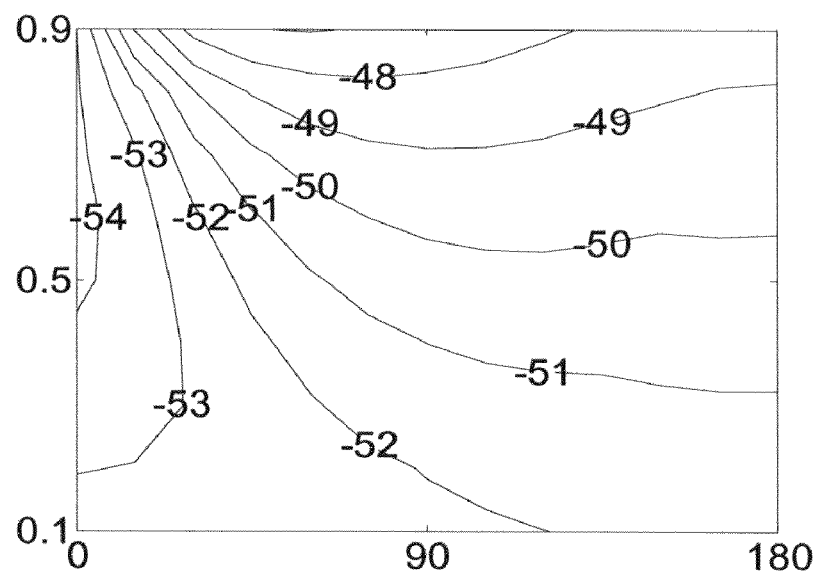
Figure 11C:
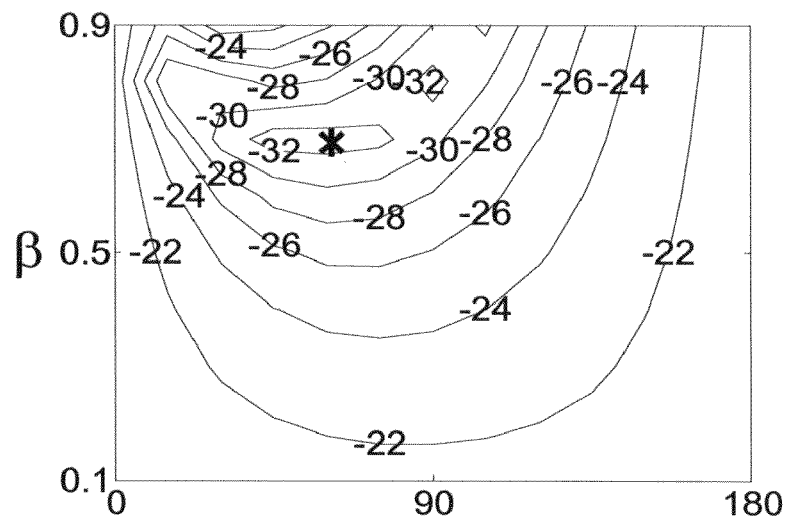
Figure 11C:
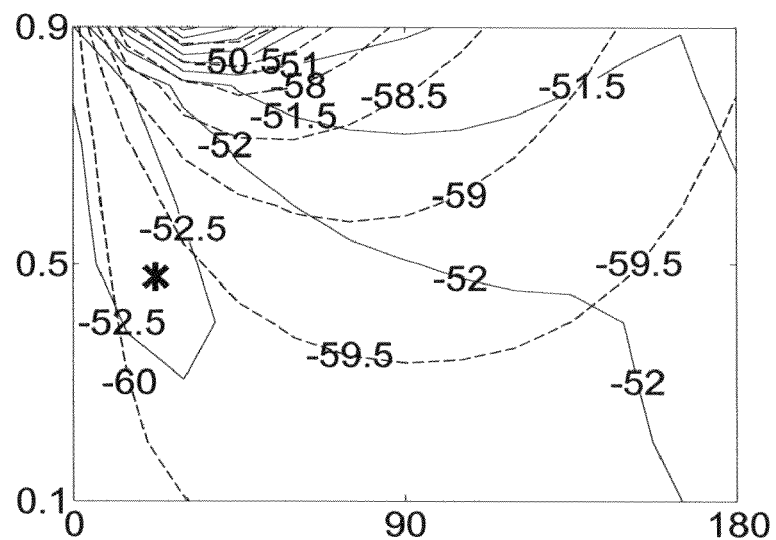
Figure 11D:
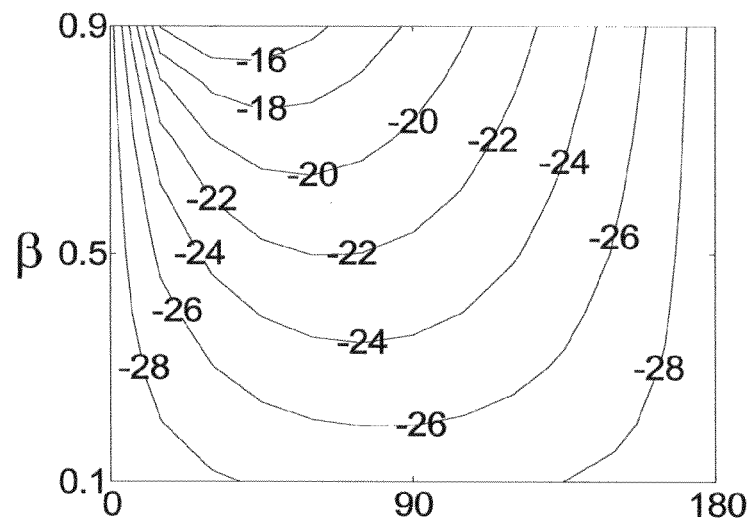
Figure 11D:
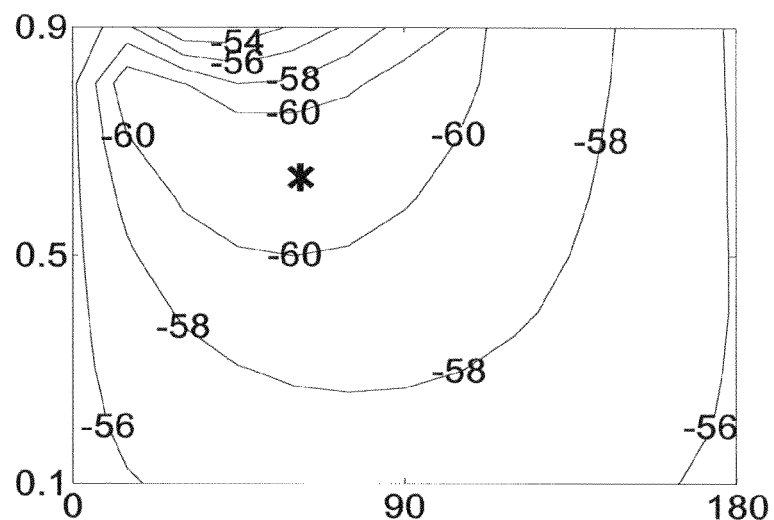
Figure 11E:
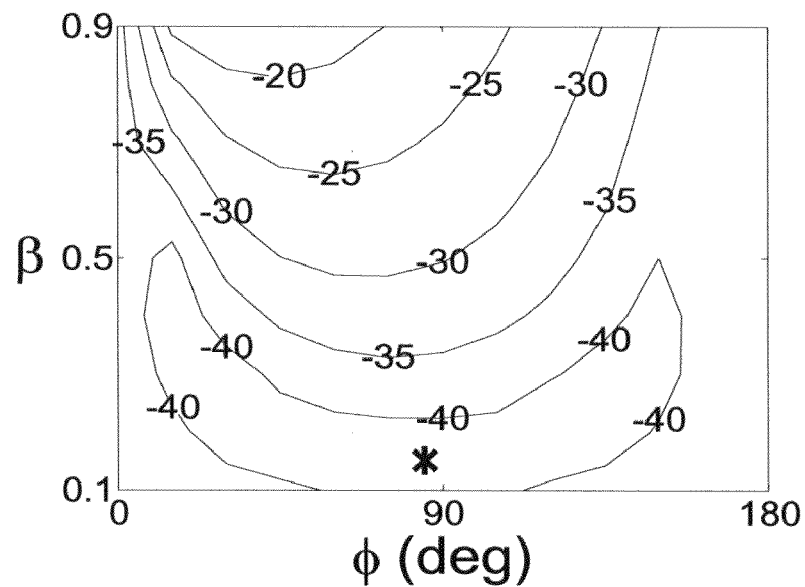
Figure 11E:
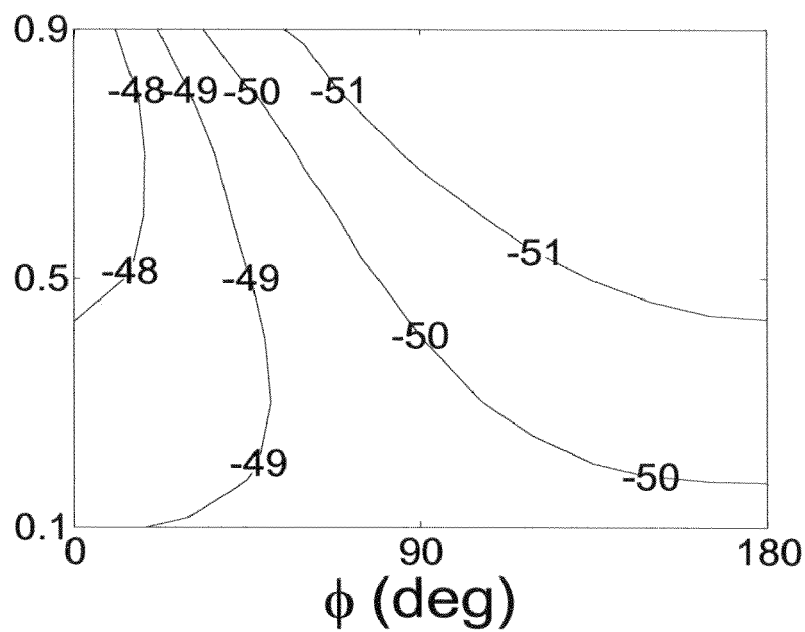
Figure 12A:
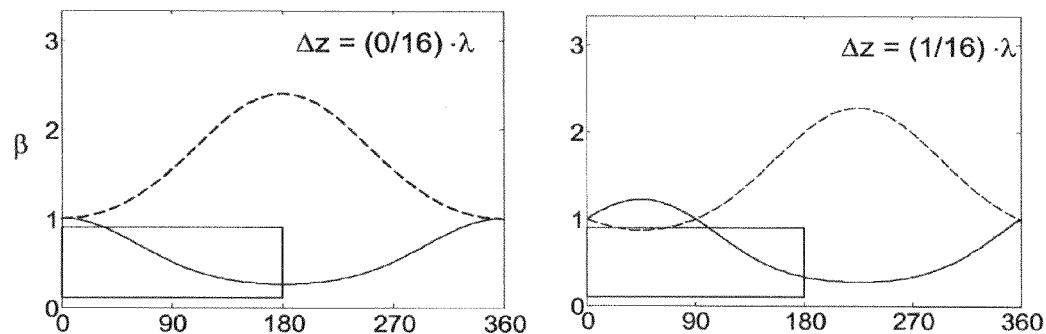
FIGS. 12A-12D show analytic solution plots of β vs. φ which make crosstalk a maximum or minimum at several layer spacings.
Figure 12B:
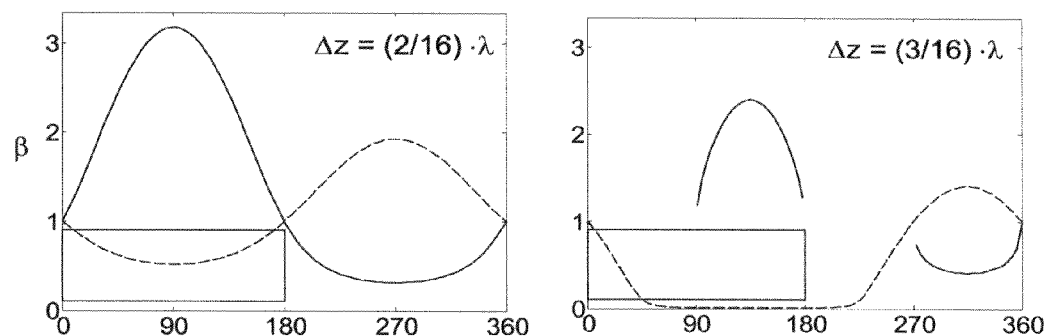
Figure 12C:
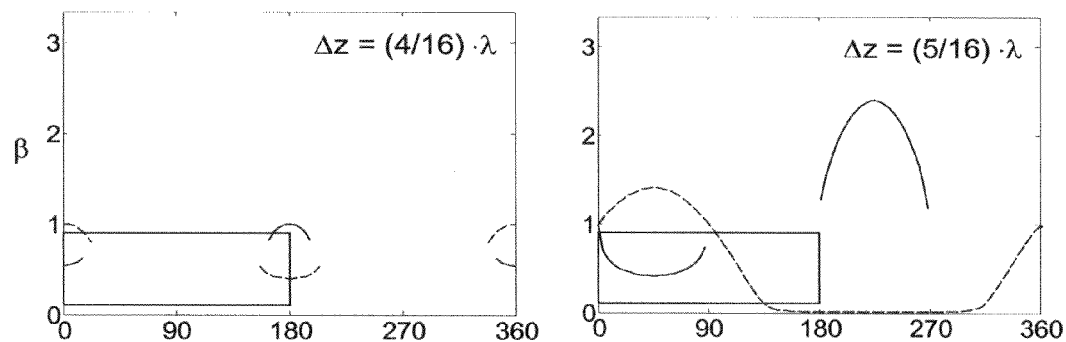
Figure 12D:
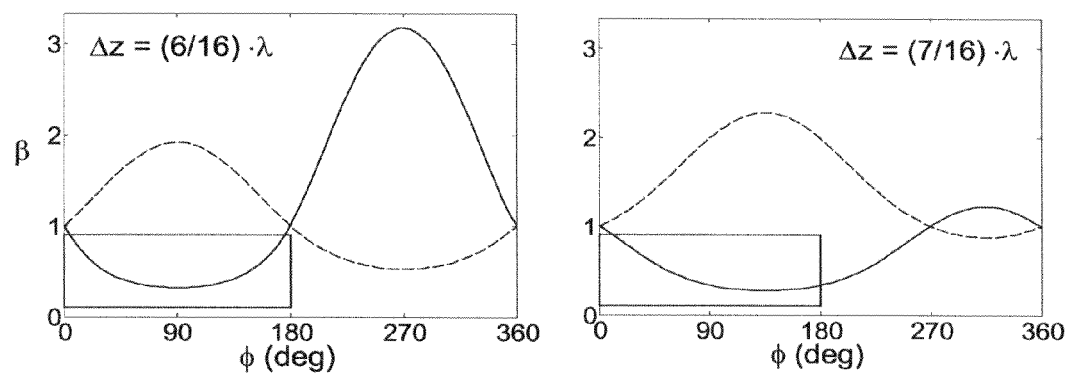

Total crosstalk X also changes with layer reflectivity, as shown in FIG. 10, which shows total crosstalk X versus layer reflectivity R (Δz=10 µm, β=0.6, and φ=π).

Case 2 is the worst-case geometry for both coherent and incoherent illumination, and case 2 for coherent illumination is unacceptable at all layer reflectivities. Case 1 exhibits lower X with increasing reflectivity.

FIG. 11 shows contour maps of total crosstalk X in a worse-case geometry (case 2, LH, R=30%, * denotes a local minimum.) with varying β and φ at several layer spacings. The dashed lines in incoherent source at Δz=5 µm, 10 µm are the total crosstalk caused by 395 nm, 405 nm, and 415 nm. General characteristics of the X maps are that incoherent illumination produces much lower X than coherent illumination. Even at Δz=5 µm, incoherent illumination produces X<−30 dB. A notable feature of the X map is that there are local minima at Δz=10 µm and 15 µm for coherent illumination and at Δz=10 µm and 12.5 µm for incoherent illumination. The dashed lines shown for incoherent illumination at Δz=5 µm and 10 µm are averaged total crosstalk X caused by a three-wavelength (395 nm, 405 nm, and 415 nm) approximation to the spectral bandwidth of an incoherent source, for example like a super luminescent diode. For wavelengths shorter than 405 nm, the interlayer spacing is effectively longer than that of 405 nm, and for wavelengths longer than 405 nm, the interlayer spacing is effectively shorter than that of 405 nm. Thus, the crosstalk at 395 nm and 415 nm show patterns similar to the crosstalk at 405 nm with a bit longer and shorter Δz, respectively. The invention is not limited to these examples. Additionally, the tolerance for the above-described layer spacings can be +/−1 µm or greater at some degradation in performance such as enhanced crosstalk.

In order to explain the existence of local minima, a simple simulation was performed for a single, normally incident plane wave. The same coefficients of reflection shown in FIG. 5 are applied. The top layer and bottom layer are considered as the signal and crosstalk layers, respectively. Sets of β and φ that make the total crosstalk X minimum or maximum are analytically found at several layer spacings, as shown in FIG. 12. In FIG. 12, the solid line represents minimum X, and the dashed line represents maximum X. The rectangle in left-bottom corner represents the size of X map shown in FIG. 11.

The solid line is the zero-crosstalk line, which gives minimum X, and the dashed line is the zero-signal line, which gives maximum X. The lines are broken in some layer spacings, where there are no real solutions. A rectangle in the left-bottom corner represents the window size used for FIG. 11. The pattern is exactly repeated each half wavelength of Δz, because no absorption is assumed. A similar periodic behavior is observed for the more exact calculation used to generate the curves in FIG. 11. Local minima can occur at some sets of β and φ which make Crosstalk zero.

Therefore, the local minima of X in FIG. 11 occur where the Crosstalk term in Table 1 has close-to-zero modulation at the corresponding β and φ. X maps for different reflectivity show patterns similar to FIG. 11. If a multi-layer medium is used, minimizing X is possible at some normalized layer spacings, like 10 µm and 15 µm for the coherent case and 10 µm and 12.5 µm for the incoherent case, by selecting proper β and φ. The tolerance range for optimum β and φ is much larger for the incoherent case.

Several factors limiting the capacity of multiple-layered data storage system are seen by the simulation work of the invention. The number of layers is primarily determined by transmission of each layer. Results show that 30 or more layers may be possible with conventional thin-film technology, if optimization of media parameters is allowed and sufficient readout signal-to-noise ratio is assumed. Inter-layer crosstalk calculated for various geometries by decomposition of reflected fields based on Babinet's principle and recombination of the components on the reference sphere showed that the desired signal includes three Base terms, and the crosstalk includes three SMX terms and one IMX term. It is verified that total crosstalk X exhibits higher values when the crosstalk layer has longer data marks than the in-focus layer. A worse case is when crosstalk layer with longer data marks is above the in-focus layer with shorter data marks. The total crosstalk is minimized for certain layer spacings determined by the simulation of the invention.

With coherent illumination, X is higher than with incoherent illumination, and the X map is periodic with respect to Δz. Optimum media design with β and φ are possible, but a relatively tighter tolerance is needed to get lower than −30 dB. Incoherent illumination shows good performance at all Δz with broad tolerances for media design parameters β and φ. Thus, use of spatially coherent but temporally incoherent light sources is an attractive option for multiple-layer reflective technology. A super-luminescent diode or a high frequency-modulated laser diode are candidates for this type of light source, and can be used in various embodiments of the invention. The existence of local minima has been analytically verified.

Optimized Media Design and Fabrication

Dual-layer recording is now at a practical engineering stage for system development in several formats, such as DVD and BD, and performance of systems using more than two conventional reflective layers for BD has been reported. Performance of systems using two-photon fluorescent media with 100's of layers is understood, but these systems exhibit low readout data rate with a single beam optical pickup.

Figure 13:
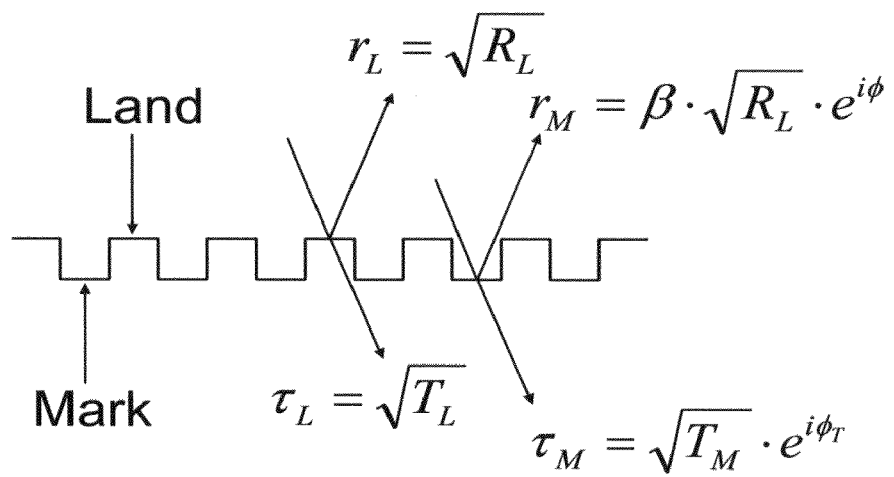
FIG. 13 shows reflection and transmission coefficients at the land and mark regions of a data layer.

The optimum condition of media parameters β and φ for conventional reflective volumetric optical data storage system is defined by where inter-layer crosstalk is minimized. β is the absolute value of the ratio of amplitude reflection coefficient of data mark area to that of land area, and φ is the phase difference between land and mark areas for reflected fields, as shown in FIG. 13. FIG. 13 shows media parameters, β and φ and the subscript L and M represent land area and mark area, respectively. From FIG. 11, the optimum condition for coherent-source illumination is $\beta=0.7$ and $\phi=60°$ at an inter-layer spacing of 10 μm for a BD-type optical system. Besides $\beta$ and $\phi$, another media parameter to consider is $\phi_T$, which is the phase shift of the transmitted field. In previous crosstalk analysis, an assumption that the data layer does not affect the distribution of the transmitted laser beam was used. To accommodate this restriction, $\phi_T$ is zero or a multiple of 360° in one embodiment of the invention. In that case, each layer reduces only power of the transmitted beam, and the phase of the propagated beam is not affected.

Methods to Find Solutions

Two methods have been used to find a thin-film solution for optimum or near optimum conditions. One is optimization using a merit function, and the other is a graphical method using the admittance diagram. Combining these two methods makes finding a solution much easier. Normal incidence is assumed in both analyses, for simplicity.

These methods are readily incorporated in a computer readable medium of the invention. Accordingly, in one embodiment of the present invention, a conventional general purpose computer or micro-processor can be programmed according to the teachings of the invention, as will be apparent to those skilled in the computer art.

For example, a processor such as described above can be used to implement the method(s) of the invention, wherein a computer of the processor houses for example a motherboard containing a CPU, memory (e.g., DRAM, ROM, EPROM, EEPROM, SRAM, SDRAM, and Flash RAM), and other optical special purpose logic devices (e.g., ASICS) or configurable logic devices (e.g., GAL and reprogrammable FPGA). The computer also includes plural input devices, (e.g., keyboard and mouse), and a display card controlling a monitor. The computer can be used to drive any of the devices or to store any of the data or program codes listed in the appended claims such as for example the reference or sample mass spectrum, among others.

Additionally, the computer may include a floppy disk drive; other removable media devices (e.g. compact disc, tape, and removable magneto-optical media (not shown)); and a hard disk or other fixed high density media drives, connected via an appropriate device bus (e.g., a SCSI bus, an Enhanced IDE bus, or an Ultra DMA bus). The computer may also include a compact disc reader, a compact disc reader/writer unit, or a compact disc, which may be connected to the same device bus or to another device bus.

The computer of processor can include at least one computer readable medium. Examples of computer readable media are compact discs, hard disks, floppy disks, tape, magneto-optical disks, PROMs (e.g., EPROM, EEPROM, Flash EPROM), DRAM, SRAM, SDRAM, etc. Stored on any one or on a combination of computer readable media, the invention can include software for controlling both the hardware of the computer and for enabling the computer to interact with a human user or to interface. Such software may include, but is not limited to, device drivers, operating systems and user applications, such as development tools.

Such computer readable media further includes the computer program product(s) or element(s) of the invention for performing the inventive method(s) described herein, including the solution optimization and graphical methods described in detail below. The computer code devices of the invention can be any interpreted or executable code mechanism, including but not limited to, scripts, interpreters, dynamic link libraries, Java classes, and complete executable programs. Moreover, parts of the processing of the invention may be distributed for better performance, reliability, and/or cost.

The invention may also be implemented by the preparation of application specific integrated circuits or by interconnecting an appropriate network of conventional component circuits, as will be readily apparent to those skilled in the art.

Optimization Using a Merit Function

A merit function is set up as root-sum-square of error quantities with weighting factors, so that $$\text{Merit Function} = \{w_1(\beta - \beta_0)^2 + w_2(\phi - \phi_0)^2 + w_3(\phi_T - \phi_{T0})^2 + w_4(R - R_0)^2 + w_5(T - T_0)^2\}^{1/2}, \quad (14)$$

where $w_i$ are weighting factors, R is reflectivity, and T is transmittance. R and T are considered in the optimization, because reasonable amount of reflection is required for acceptable signal-to-noise ratio in readout and the maximum number of possible layers is limited by layer transmittance. The description and the target values of all parameters considered in the merit function are shown in Table 2.

The merit function is minimized during optimization with respect to coating thickness and refractive index. It is useful to use this optimization method for finding a starting point or fine-tuning of the graphical method using an admittance diagram, which is discussed in next section.

TABLE 2

Parameters considered in merit function.

| Parameter | Description | Target |
|---|---|---|
| $\beta$ | Amplitude ratio of mark reflection to land reflection | 0.7 |
| $\phi$ | Phase shift of reflected fields from land and mark | 60° |
| $\phi_T$ | Phase shift of transmitted fields from land and mark | 0° |
| R | Reflectivity of land | 10% |
| T | Transmittance of land | 90% |

For this numerical optimization, a MATLAB™ internal function *fminsearch* was used. *fminsearch* finds the minimum of a scalar function of several variables, starting at an initial estimate. Other functions suitably programmed can be used. This is generally referred to as unconstrained nonlinear optimization, and specifically, the Nelder-Mead simplex method is used. A drawback of using this function is that the result is sensitive to the initial starting point. The optimized value can be trapped in a local minimum close to the initial point. The particular merit function specified by Equation 14 has a large number of local minima, so a single calculation using *fminsearch* typically does not yield the global minimum. Initial points are randomly given repeatedly in order to search for a global minimum. 5000 random trials for initial point are calculated, and the combinations returning smaller value than pre-determined acceptable value of merit function are saved. The invention is not limited to these particular examples.

Graphical Method Using Admittance Diagram

This graphical method uses an admittance diagram to find the best combination of materials and coating thickness. The admittance of an optical coating is calculated by a characteristic matrix technique. The characteristic matrix technique assigns a 2×2 matrix of values to each layer that completely specifies its optical response to plane-wave illumination at a given angle, polarization and wavelength. By multiplying the 2×2 matrices of a film stack in the order of their orientation in the film stack, the complete description of the optical response of the layer stack can be determined for plane-wave illumination at a given angle, polarization and wavelength.

Figure 14:
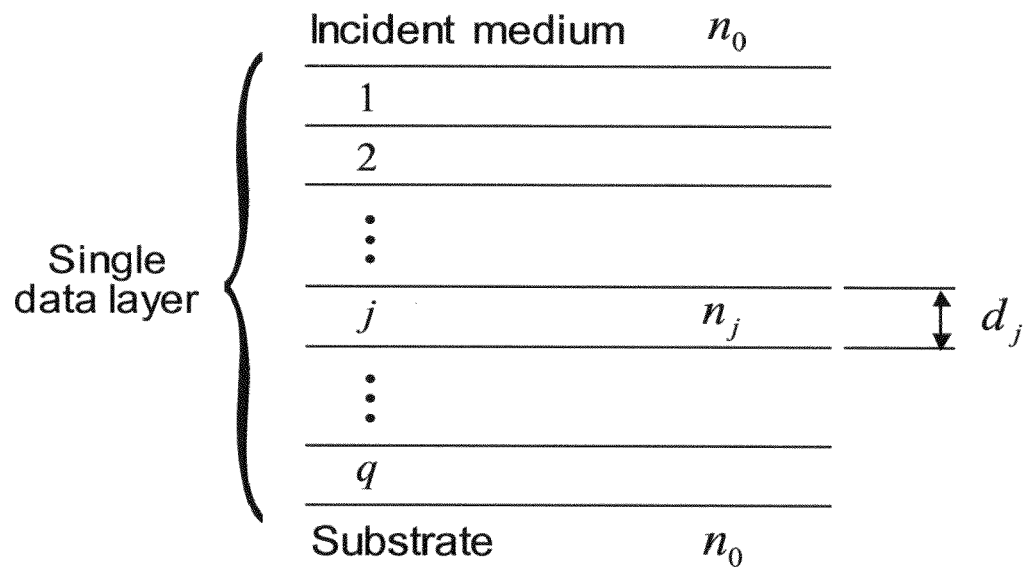
FIG. 14 shows a general structure of a single data layer according to an embodiment of the invention.

FIG. 14 shows the general structure of an optical thin-film system, which represents a single data layer. In this case, the incident medium and substrate medium are the spacer material used between data layers, which has index $n_0$. General structure of thin films representing a single data layer. $d_j$ is the thickness of the j-th sublayer. $n_0$ is the refractive index of the incident medium and the substrate. Normalized total tangential electric and magnetic fields at the input surface, B and C, respectively, are calculated as $$\begin{bmatrix} B \\ C \end{bmatrix} = \left( \prod_{j=1}^{q} \begin{bmatrix} \cos\delta_j & -\frac{i}{n_j}\sin\delta_j \\ -in_j\sin\delta_j & \cos\delta_j \end{bmatrix} \right) \begin{bmatrix} 1 \\ n_0 \end{bmatrix} = \begin{bmatrix} m_{11} & m_{12} \\ m_{21} & m_{22} \end{bmatrix} \begin{bmatrix} 1 \\ n_0 \end{bmatrix} \quad (15)$$

where $\delta_j = 2\pi n_j d_j / \lambda$, and $\lambda$ is design wavelength. The refractive index of j-th sublayer, $n_j$ is generally complex, if the corresponding material has absorption like metal. C and B give the surface admittance of whole system Y as $$Y = \frac{C}{B}. \quad (16)$$

The reflection coefficient r and transmission coefficient t are expressed as $$r = \frac{n_0 - Y}{n_0 + Y} = \frac{m_{11}n_0 + m_{12}n_0^2 - m_{21} - m_{22}n_0}{m_{11}n_0 + m_{12}n_0^2 + m_{21} + m_{22}n_0}, \quad (17)$$

and $$t = \frac{2n_0}{m_{11}n_0 + m_{12}n_0^2 + m_{21} + m_{22}n_0}. \quad (18)$$

The reflectivity R and the transmittance T are then given by R=rr* and T=tt*, respectively.

Figure 15:
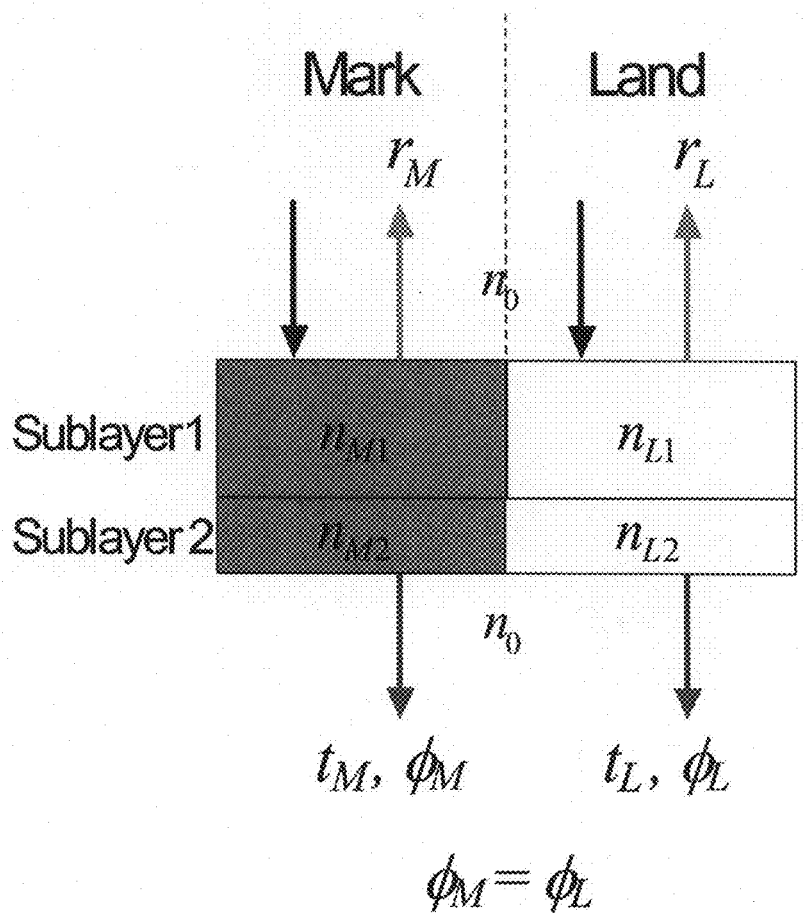
FIG. 15 shows a general structure of a data layer having two thin-film sublayers.

The general data structure with two thin-film sublayers is shown in FIG. 15. $r_M$ and $r_L$ are the amplitude reflection coefficients for mark and land, respectively. $t_M$ and $t_L$ are the amplitude transmission coefficients for mark and land, respectively. $n_{M1}$ and $n_{L1}$ are the refractive indices of sublayer 1 for mark and land, respectively. $n_{M2}$ and $n_{L2}$ are the refractive indices of sublayer 2 for mark and land, respectively. $n_0$ is the refractive index of the incident medium and the substrate. The amplitude reflection coefficients of land and mark, $r_L$ and $r_M$ are expressed as $$r_L = \frac{n_0 - Y_L}{n_0 + Y_L}, \quad (19)$$

and $$r_M = \frac{n_0 - Y_M}{n_0 + Y_M}. \quad (20)$$

Equation 20 is divided by Equation 19 to introduce $\beta$ and $\phi$.

$$\frac{r_M}{r_L} = \frac{(n_0 - Y_M)(n_0 + Y_L)}{(n_0 + Y_M)(n_0 - Y_L)} = \beta \cdot e^{i\phi} \quad (21)$$

Equation (21) is solved for $Y_M$ in terms of $Y_L$, $\beta$, and $\phi$. The result is $$Y_{MD} = \frac{(1 + \beta e^{i\phi})Y_L + (1 - \beta e^{i\phi})n_0}{(1 - \beta e^{i\phi})Y_L + (1 + \beta e^{i\phi})n_0} \cdot n_0. \quad (22)$$

Figure 16:
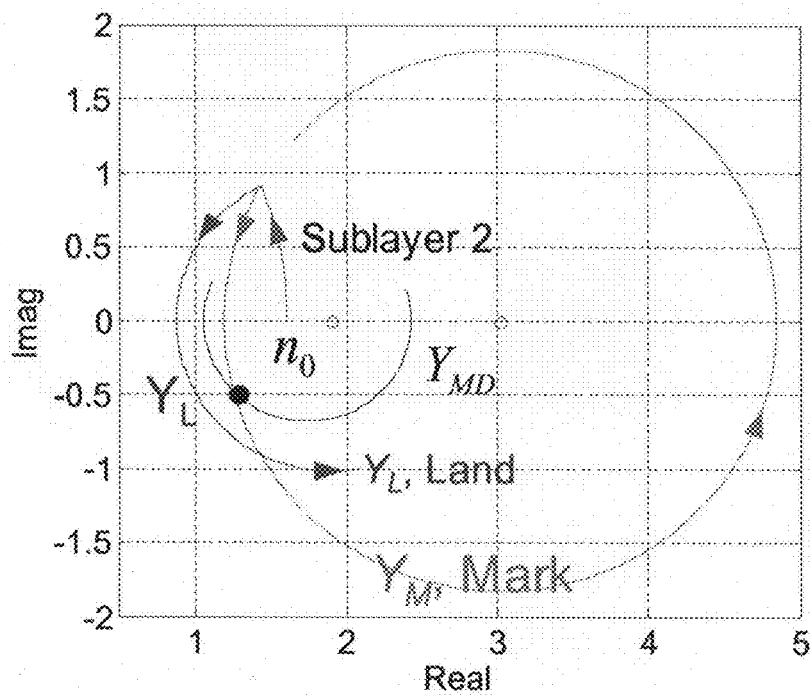
FIG. 16 shows examples of admittance diagrams for a case where a sub-layer has a solution for minimizing crosstalk and for a case where a solution does not exist.
Figure 16:
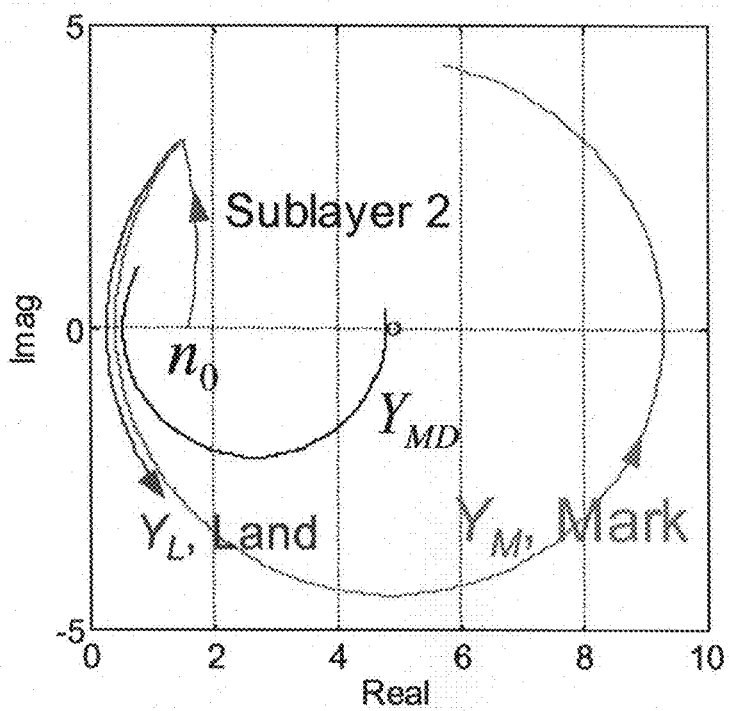

$Y_{MD}$ is the desired admittance of a mark for the pre-determined land admittance satisfying for example $\beta$=0.7 and $\phi$=60°. Other conditions for $\beta$ and $\phi$ could be determined for example depending on a degree of cross talk or a sensitivity of an optical reader to measure and distinguish land and mark signals. Therefore, a solution exists in this example of $\beta$=0.7 and $\phi$=60° for pre-determined land admittance if there is an intersection between actual $Y_M$ and $Y_{MD}$ in the admittance diagram. Two examples are illustrated in FIG. 16, where the structure with two sublayers shown in FIG. 15 are considered, and sublayer 2 is the same for both land and mark. Admittance diagrams of arbitrary data structures (a) with solution (b) without solution. Sublayer 2 is assumed to be same metallic layer to both land and mark. The admittance diagram starts at the refractive index of the substrate $n_0$, and it rotates counter-clockwise as the coating thickness of sublayer 2 increases. At the proper thickness of sublayer 2, sublayer 1 for the land ($Y_L$) starts to reach a proper thickness. Then, the desired mark admittance $Y_{MD}$ and actual mark admittance $Y_M$ for a selected material are drawn.

There is an intersection between $Y_{MD}$ and $Y_M$ in FIG. 16(*a*). Thus, there is a solution satisfying the optimum medium condition. On the other hand, there is no intersection between $Y_{MD}$ and $Y_M$ in FIG. 16(*b*). Thus, the solution does not exist for the combination of materials in FIG. 16(*b*).

Geometries Considered

Figure 17:
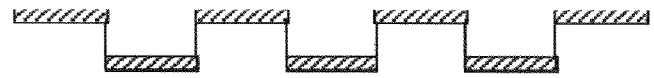
FIG. 17 shows several embodiments considered for designing an optical medium.
Figure 17:
Figure 17:
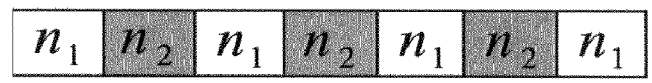
Figure 17:
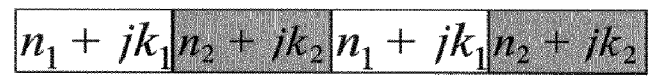
Figure 17:
Figure 17:
Figure 17:

Several geometries have been considered in the invention to design a medium satisfying the optimum media parameters, as shown in FIG. 17. A metal layer coated on pit structure, single dielectric layer, two dielectric layers, phase change material, combination of metal and single dielectric, combination of metal and two dielectrics, and combination of metal and phase change material are shown in FIG. 17(*a*)-(*g*). The design of each geometry to satisfy the optimum condition was considered in detail below. While the results below are presented from of viewpoint of preferred selections from these geometries, these results are for purposes of illustrating the principles of the invention and are not intended to discount the utility of those non-preferred geometries under other laser illumination or materials selection or spacing considerations, whose mathematical calculations would follow straightforwardly from the techniques detailed below.

Metal Layer on Pit Structure

For this geometry, the reflectivities of land and mark areas are controlled by metal sublayer thicknesses in land and mark areas in one embodiment of the invention. Two metal thickness showing reflectivities satisfying $\beta$=0.7 were found to be suitable, and the phase shift for reflection due to different thickness of metal was calculated. This phase shift is small quantity compared with $\phi$=60°. Then, a pit depth that gives $\phi$=60° with the phase shift due to reflection from metal was calculated. Phase difference between land and mark areas for the reflected fields was mainly controlled by the pit depth in this simulation.

Figure 18:
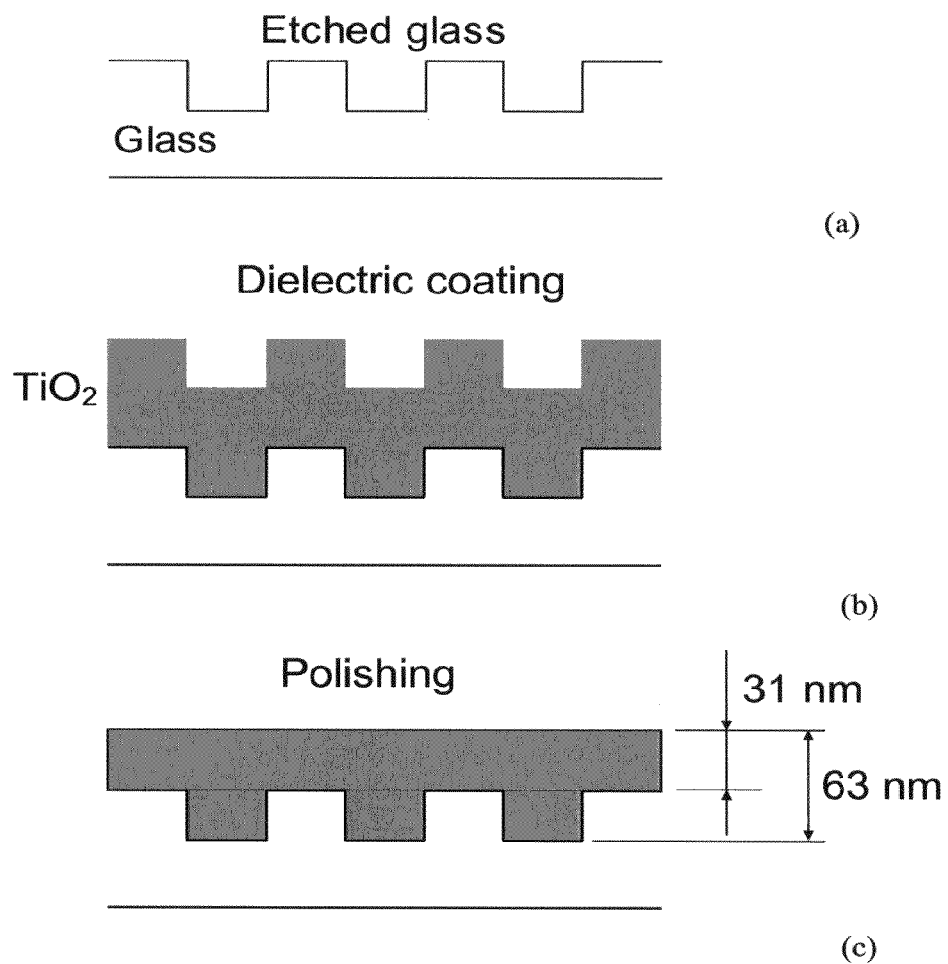
FIG. 18 depicts a procedure for fabricating a metal layer on a pit structure according to an embodiment of the invention.

The procedure to fabricate a metal layer on a pit structure in one embodiment of the invention is illustrated in FIG. 18. These or similar techniques can be used to fabricate the structures detailed in FIG. 17. A photoresist is spin-coated on the glass, and the photoresist is exposed and developed to make the pit-data pattern, as shown in FIG. 18(a). The result is ion-milled to etch the glass surface, and gold is sputter-coated on the etched surface, as shown in FIGS. 18(b) and (c), respectively. Then, the sample is polished to remove the gold layer on high areas, and a second gold layer is coated, as shown in FIGS. 18(d) and (e), respectively. Finally, the empty spaces between high and low areas are filled with epoxy by either spin coating or laminating with another glass plate. The refractive index of a typical optical epoxy is 1.53 at 589 nm, which is very close to that of glass. Light is incident onto the sample in FIG. 18(f) from bottom to top. Low areas with thicker gold coatings act as lands, and high areas with thinner gold coatings act as marks.

The reflectivities of land and mark areas are controlled by gold coating thickness, and the phase shift is mainly controlled by pit depth. A 39 nm pit depth and 12 nm and 19 nm of gold thicknesses for the marks and lands, respectively, gave $\beta=0.7$ and $\phi=60°$ at 650 nm wavelength. The reflectivity of lands is 10% for the combination. For this design, it is relatively easy to satisfy $\beta$ and $\phi$, however there are some drawbacks. The transmittance is only 50%, which is low, because of the thick metal layers. This can be a disadvantage for stacking a large number of layers inside medium. Also, phase shift in the transmitted fields is $\phi_T=27°$. This amount of phase shift can cause perturbations on the transmitted field distribution. In addition, the pit depth may not practical enough to polish. The depth of the pattern may not reduce to the desired depth as polished, because both high and low areas are polished together. Improved methods for applying multiple gold coatings would make this embodiment more useful. Experimentally, the polishing difficulties may make testing of the simulated structure inaccurate.

Single-Dielectric Layer

The procedure to fabricate a single dielectric layer in one embodiment of the invention is illustrated in FIG. 18. The dielectric is coated on the glass substrate that is etched after a photo-lithography process, and the dielectric is polished to make the surface flat. In this geometry, finding a solution is relatively difficult, because the refractive index of dielectric, thickness of dielectric, and pit depth are all interconnected for the calculation of the optimum parameter condition. An example of a solution found is as follows: total dielectric thickness is 63 nm and pit depth is 32 nm, when $TiO_2$ is used. The refractive index of $TiO_2$ is 2.4 at $\lambda=650$ nm. For this solution, $\beta=0.7$, $\phi=40°$, $\phi_T=71°$, R=18%, and T=82%. A solution which satisfies $\beta=0.7$ and $\phi=60°$ was not found for the set of materials and dimensions simulated. Experimentally, the pit depth may not be high enough to polish easily, so testing of the simulated structure may not be accurate.

Two Dielectric Layers

FIG. 19 shows the geometry of two dielectric layers. Instead of a pit of single dielectric layer geometry, another dielectric material is used to make the desired phase shift. With this geometry, $\beta=0.7$ can be relatively easily satisfied. However, both $\phi=60°$ and $\phi_T=0°$ are relatively difficult to satisfy at the same time because of the limited number of commonly used dielectric materials. Improved availability of dielectric materials would make this embodiment more useful. Here again, practical concerns may make testing of the simulated structure inaccurate.

Phase Change Material

Figure 21:
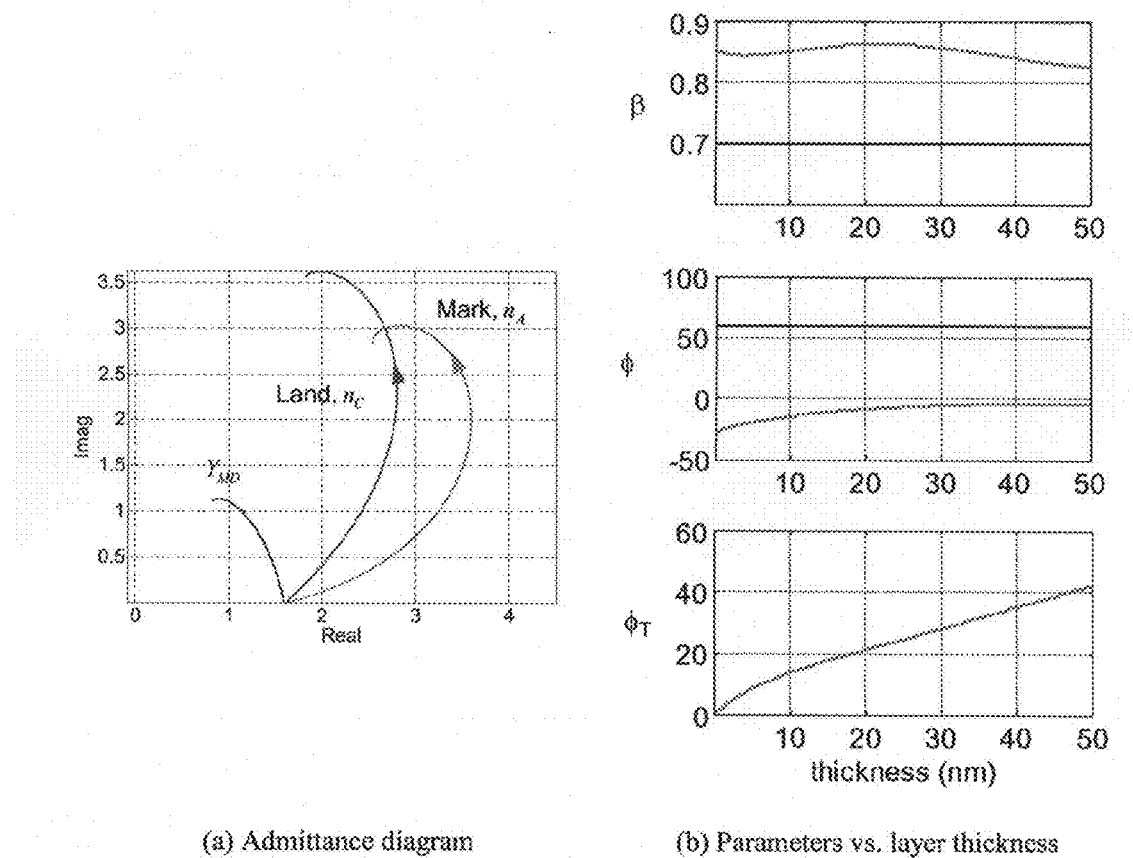
FIG. 21 shows an admittance diagram and parameter versus layer thickness diagrams for the phase change material geometry.

FIG. 20 shows the geometry for a phase change material, where $n_A$ and $n_C$ are the refractive indices of amorphous phase and crystalline phase, respectively. Phase change material is very attractive if it can satisfy the optimum medium condition, because of its rewritability. One class of phase change material used is GeSbTe including for example $Ge_2Sb_2Te_5$, and its refractive indices at 405 nm are $n_A=2.582+2.806i$ and $n_C=1.828+3.546i$. This phase change material is basically same as a metal having high real index. The admittance of a metal converges to its complex refractive index in the admittance diagram as its thickness increases, unlike a dielectric. FIG. 21(a) shows the admittance diagram as the phase change material is coated (i.e., its thickness is increased). It is noticed that a solution does not exist, because there is no intersection between the mark admittance and $Y_{MD}$. This observation is verified in FIG. 21(b). There is in this simulation no point satisfying $\beta=0.7$ and $\phi=60°$.

Metal and Single Dielectric Layers

Figure 22:
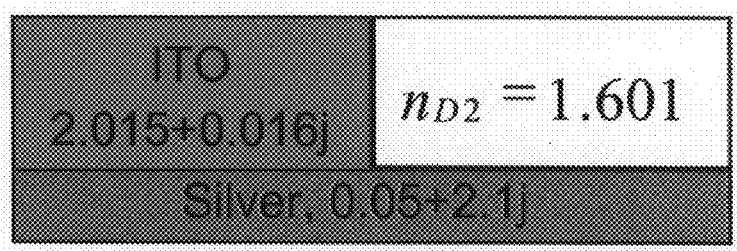
FIG. 22 shows a geometry of metal and single dielectric layers according to an embodiment of the invention.

The structure of a metal and a single dielectric layer is shown in FIG. 22. The thickness of silver layer is 9 nm, and dielectric layer thickness is 28 nm. The tolerance range for these thickness values is around +/−10%. The mark includes a high-index dielectric and the metal. The land includes the substrate material and the metal. Two metals applicable for various embodiments of the invention include silver and aluminum. Other metals may be workable in combination with other dielectrics. First, the dielectric refractive index is optimized for a silver sublayer, and the optimized index value is 2.0102, which is very close to the refractive index (2.015+0.016i) of indium tin oxide (ITO). Next, the dielectric refractive index is optimized for aluminum sublayer, and the optimized index value is 1.828. Unfortunately, a material with refractive index close to this value was not identified in this simulation. Therefore, the combination of ITO and silver was used in the illustrative example described below. In either case, the metal layer in one embodiment is as thin as possible in order to have a high transmittance through the metal.

Figure 23:
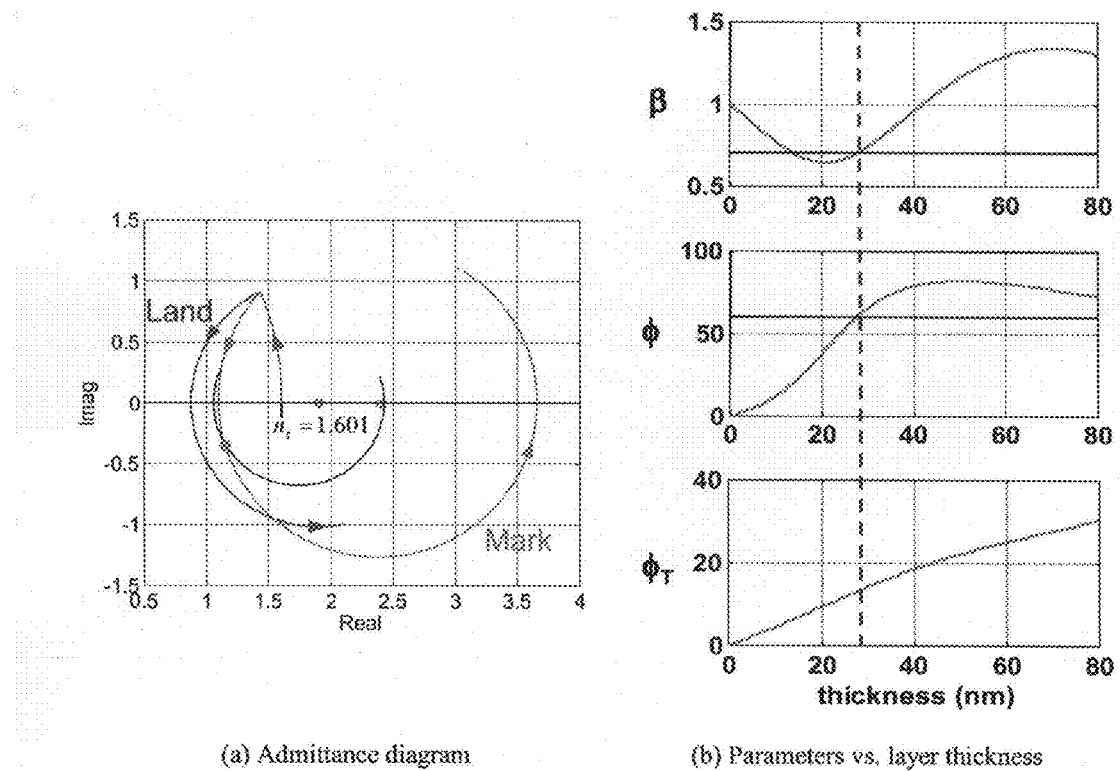
FIG. 23 shows an admittance diagram and parameter versus layer thickness diagrams for the geometry of metal and single dielectric layers.

In this illustration, silver is coated on the substrate, and ITO is coated on the silver to form the mark in this illustrative example. The incident medium is the same as the substrate. The system admittance diagram is shown in FIG. 23(a). The admittance line starting from the refractive index of the substrate is for the silver layer, and the same thickness is used for both land and mark. Then, the admittances of land and mark areas are drawn for dielectrics. A solution exists, because there is an intersection between $Y_M$ and YMD. FIG. 23(b) confirms the existence of the solution. The silver thickness is 9 nm, and dielectric thickness is 28 nm for the optimized structure at $\lambda=405$ nm. The resultant performance is $\beta=0.7$, $\phi=60.4°$, $\phi_T=13.1°$, R=8.5%, and T=90%. The reflectivity and transmittance are for the land regions. Both $\beta$ and $\phi$ are satisfied, and $\phi_T$ is also very small. Reflectivity is reasonable to detect the power of reflected light, and transmittance is high enough to stack 42 layers with a BD-like optical system. However, fewer data layers may also be used, such as 5 data layers or 20 data layers.

Metal and Two Dielectric Layers

Figure 25:
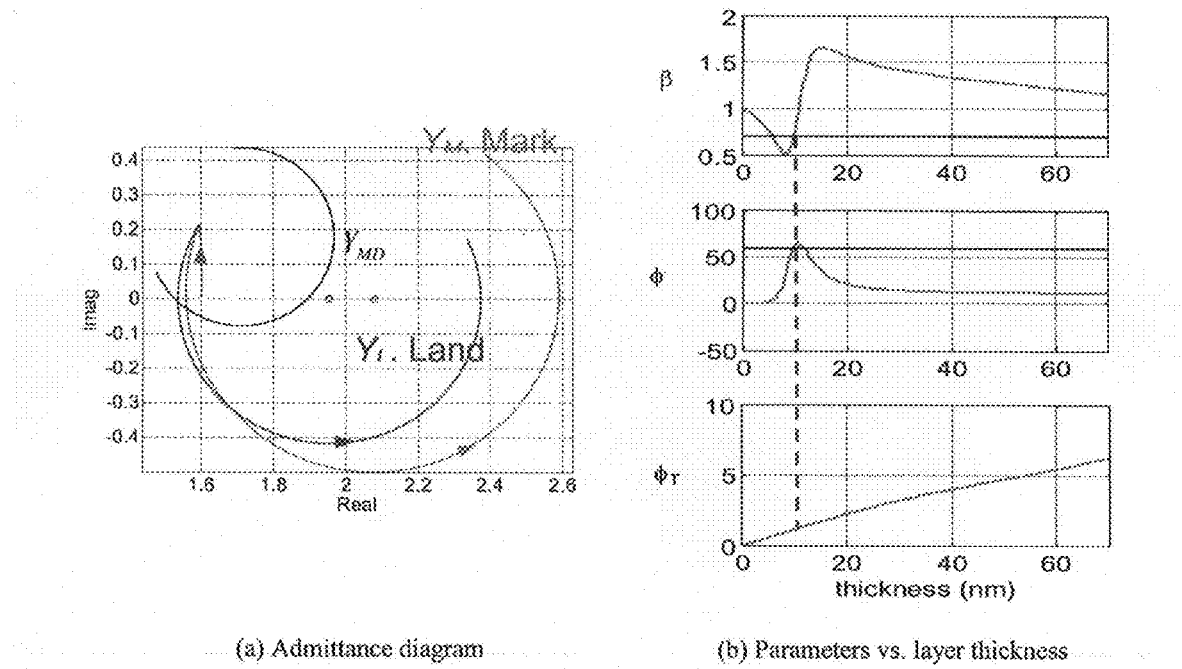
FIG. 25 shows an admittance diagram and parameter versus layer thickness diagrams for the geometry of metal and double dielectric layers.

FIG. 24 shows the structure of a metal and two dielectric sublayers. Instead of using the same material as the substrate for the land, another dielectric is used to reduce $\phi_T$. The thickness of silver layer is 2 nm, and dielectric layer thickness is 9.8 nm. One more degree of freedom in the design is added with respect to the metal and single dielectric layer design. A material with refractive index smaller than the substrate did not provide a solution in the simulation. The refractive index of the substitute of the substrate should be higher than that of the substrate and lower than that of ITO. There are not many materials satisfying the condition described above at λ=405 nm. Also, when a material with index higher than that of the substrate is used, the thickness of the dielectric coating satisfying β=0.7 and φ=60° are separated. A candidate satisfying the optimum condition and the index condition described above is $Bi_2O_3$. The refractive index of $Bi_2O_3$ is 1.91 at λ=405 nm. For this combination, silver layer thickness is 2 nm, and the dielectric layer thickness is 9.8 nm. With this structure, the resultant performance is that β=0.7, φ=61.7°, $\phi_T$=1.1°, R=0.05%, and T=99.6%. Now, $\phi_T$ is very close to zero. However, the reflectivity is relatively low, which may present practical issues in detecting reflected light with some detectors. The slopes of β and φ are very steep around the solution as shown in FIG. 25(b). A relatively tight thickness control would be used in this embodiment.

Metal and Phase Change Material

Figure 26:
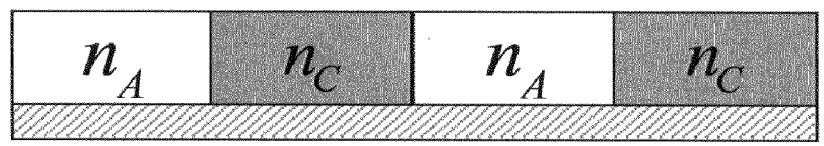
FIG. 26 shows a structure of combining a metal and phase change material.
Figure 27:
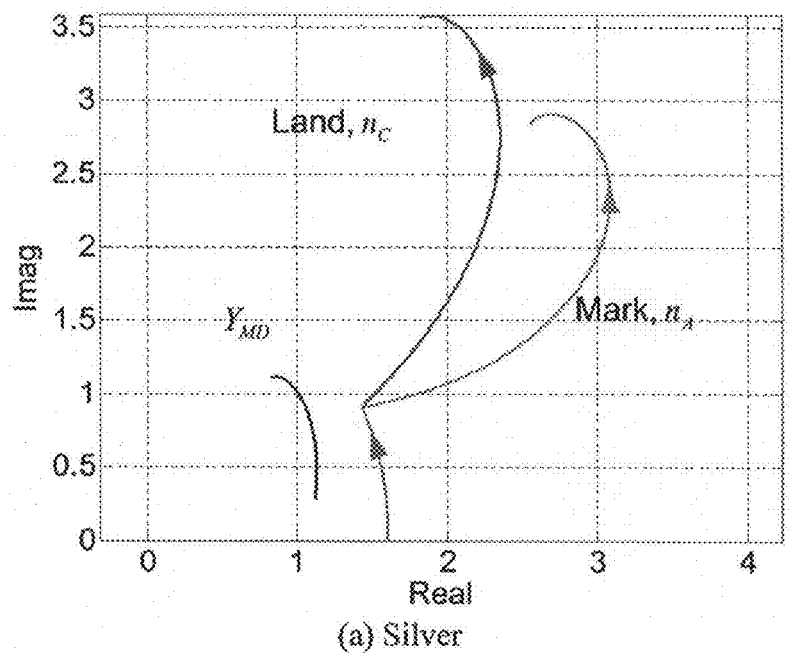
FIG. 27 shows admittance diagrams for combining a metal and phase change material with different metals used.
Figure 27:
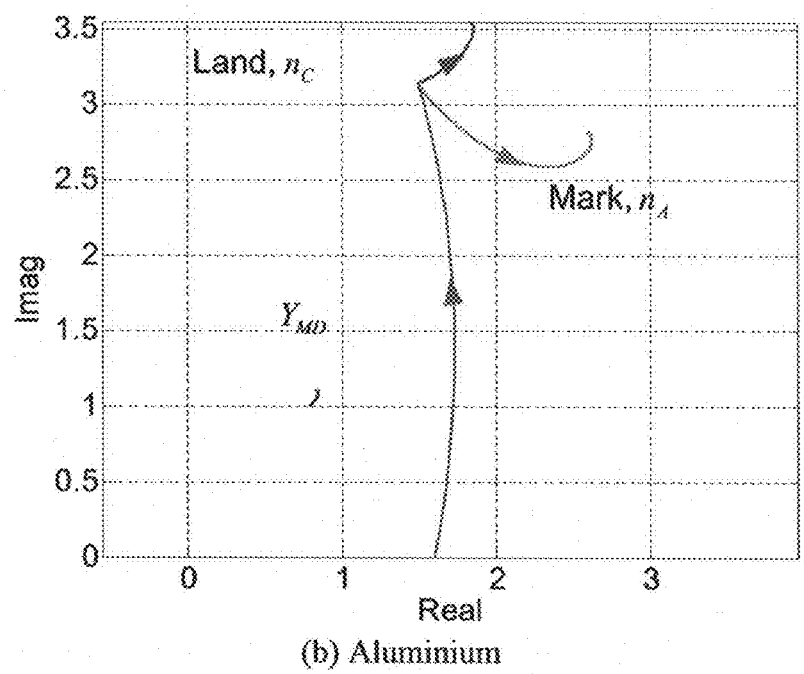

The combination of a metal and phase change material structure is shown in FIG. 26. The same phase change material as discussed above was used in these calculations. Silver and aluminum with thickness of 9 nm were used as the metal sublayer, but there was no solution, as shown in the calculation depicted in FIG. 27.

Tolerance Analysis

According to FIG. 11, the acceptable ranges of β and φ for coherent source at Δz=10 μm can be estimated as $$\beta = 0.7 \pm 0.02, \quad (23)$$

and $$\phi = 60° \pm 15° \quad (24)$$

Variations for β and φ can exceed these tolerances but with increased cross talk.

Since β is independent of φ, it can be treated separately. β is expressed as a function of reflectivities of mark and land area.

$$\beta = \left|\frac{r_M}{r_L}\right| = \sqrt{\frac{R_M}{R_L}} \quad (25)$$

The error of β, Δβ caused by errors in $R_M$ and $R_L$ is calculated as $$\Delta\beta = \sqrt{\left(\frac{\partial\beta}{\partial R_M}\Delta R_M\right)^2 + \left(\frac{\partial\beta}{\partial R_L}\Delta R_L\right)^2} \quad (26)$$
$$= \sqrt{\left(\frac{1}{2\beta}\right)^2 \Delta R_M^2 + \left(\frac{\beta}{2R_L}\right)^2 \Delta R_L^2}.$$

Figure 28A:
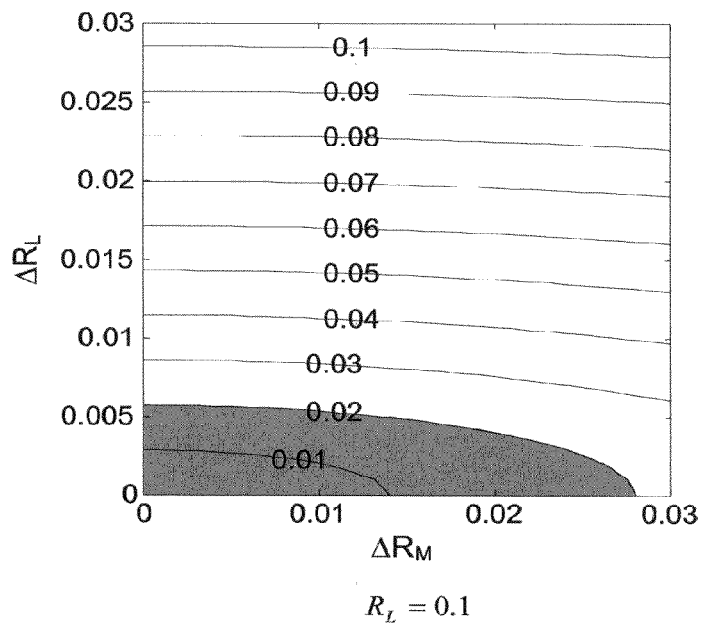
FIGS. 28A and 28B show contour maps that shows acceptable tolerances for different reflectivity values.
Figure 28B:
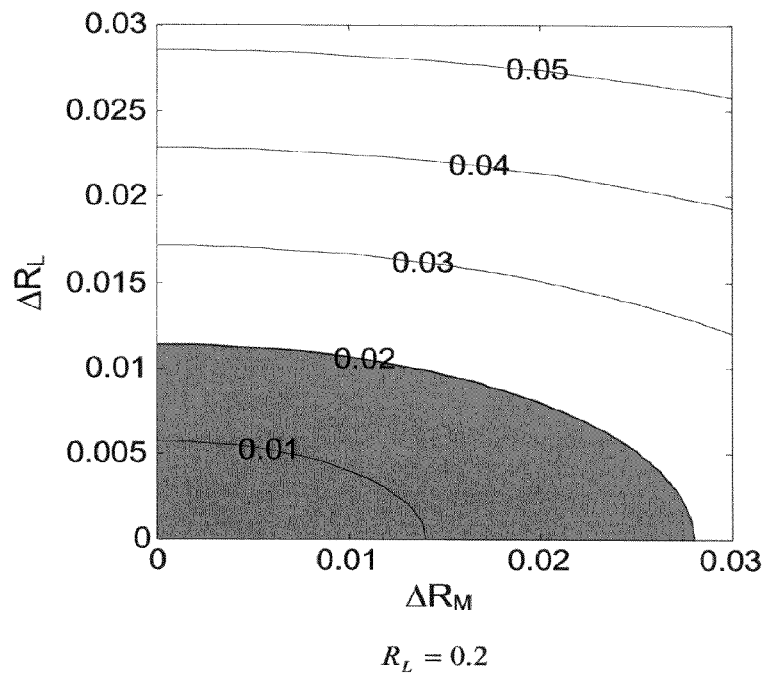

The sensitivity of Δβ to $\Delta R_M$ is constant, but the sensitivity of Δβ to $\Delta R_L$ is increasing with decreasing $R_L$. FIG. 28 shows error of β caused by errors in $R_M$ and $R_L$. Shaded areas represent acceptable tolerance. FIG. 28 shows the contour maps of Δβ when $R_L$=0.1 and $R_L$=0.2. The shaded areas under the lines of Δβ=0.02 represent acceptable tolerances for $R_L$ and $R_M$. It was shown that Δβ is more sensitive to $\Delta R_L$ than to $\Delta R_M$. The tolerance of $R_L$ becomes more generous as $R_L$ increases. When $R_L$=10% and 20%, the intersections of Δβ=0.02 line with $R_L$ axis are 0.57% and 1.14%, respectively. The intersection of Δβ=0.02 line with $R_M$ axis is 2.8%, regardless of $R_L$. Therefore, tighter control on $R_L$ is required in this embodiment.

The phase difference between fields reflected from land and mark area includes two factors, as shown in Equation 27.

$$\phi = \phi_D + \delta\phi_R \quad (27)$$

The first term in the right side of Equation 27 is the phase difference due to mark pit depth, and the other term is phase shift due to reflection from a layer with absorption, like a metal. $\phi_D$ is (2π/λ)2nd for normal incidence, when d is pit depth, and n is the refractive index of incident side. However, there are difficulties in generalizing the tolerance analysis for $\delta\phi_R$, because it is a function of layer thickness and complex refractive index, and it is pre-determined by the optimum condition of β. Thus, the tolerance of φ should be analyzed in each specific case. Nevertheless, their sensitivities in terms of phase angle are the same, because φ is just a summation of them. For example, a geometry is considered where $\phi_D$ is 65.7° and $\delta\phi_R$ is −6.2°. In this case, the tolerance of metal sublayer thickness is already tightly controlled. Thus, the budget of tolerance for φ mainly assigned to $\phi_D$. Δd=(15°)·(λ/4πn)=8.9 nm.

The above description describes a method of determining the local minima of inter-layer crosstalk for conventional reflective thin-film medium in β–φ space at several inter-layer spacings. If the optimum condition of the media parameters are satisfied, an embodiment of an optical recording medium may be found where the inter-layer crosstalk can be minimized. Numerical optimization using merit function and graphical method using admittance diagram were combined. Several geometries were analyzed, and an embodiment including metal and single dielectric layers shows favorable results among the geometries. A medium with silver and ITO on polycarbonate (PC) substrate is designed at λ=405 nm. It is seen that 42 layers are possible to stack for this medium with BD-like optical system.

Numerous modifications and variations on the present invention are possible in light of the above teachings. It is, therefore, to be understood that within the scope of the accompanying claims, the invention may be practiced otherwise than as specifically described herein.

The invention claimed is:

1. An optical medium comprising:
   a plurality of data layers stacked relative to each other in a dielectric medium;
   a respective data layer including mark and land regions for having information recorded thereon; and
   said mark and land regions disposed beside each other, and having substantially the same optical path length across respective thicknesses of said mark and land regions.

2. An optical medium according to claim 1, wherein said respective data layer includes a sublayer of a metallic material.

3. An optical medium according to claim 2, wherein said respective data layer includes a dielectric medium as a land region and a metallic oxide medium as a mark region disposed beside each other.

4. An optical medium according to claim 3, wherein said metallic oxide medium comprises indium tin oxide, and said sub-layer comprises a silver sub-layer.

5. An optical medium according to claim 4, wherein the indium tin oxide layer has a thickness of approximately 28 nm and the silver sub-layer has a thickness of approximately 9 nm.

6. An optical medium according to claim 3, wherein said respective data layer has a reflectivity of at least 5%.

7. An optical medium according to claim 3, wherein said respective data layer has a reflectivity of at least 10%.

8. An optical medium according to claim 3, wherein said respective data layer has a reflectivity of at least 15%.

9. An optical medium according to claim 3, wherein said respective data layer has a transmittance of at least 70%.

10. An optical medium according to claim 3, wherein said respective data layer has a transmittance of at least 80%.

11. An optical medium according to claim 3, wherein said respective data layer has a transmittance of at least 90%.

12. An optical medium according to claim 1, comprising at least 5 of the data layers.

13. An optical medium according to claim 1, comprising at least 20 of the data layers.

14. An optical medium according to claim 1, comprising at least 40 of the data layers.

15. An optical medium according to claim 1, wherein land materials comprise land regions of the respective data layers having substantially the same reflectivity, and mark materials comprise the mark regions of the respective data layers having substantially the same reflectivity.

16. An optical medium according to claim 1, wherein land materials comprise land regions of the respective data layers having substantially the same transmittance, and mark materials comprise the mark regions of the respective data layers having substantially the same transmittance.

17. An optical medium according to claim 1, wherein a desired admittance of said one of the mark regions satisfies a condition of $$Y_{MD} = \frac{(1+\beta e^{i\phi})Y_L + (1-\beta e^{i\phi})n_0}{(1-\beta e^{i\phi})Y_L + (1+\beta e^{i\phi})n_0} \cdot n_0$$

where $Y_L$ is the admittance of one of the land regions besides said one of the mark regions, $\beta$ is a scaling parameter ratio of mark reflection to land reflection, $\phi$ is total phase shift of a mark in reflection compared to that of a land, and $n_0$ is the refractive index of the dielectric medium.

18. An optical medium according to claim 17, wherein a spacing between data layers is 10 μm, $\beta$ is set to 0.7 and $\phi$ is set to 60° in order to minimize crosstalk between the respective layers.

19. An optical medium according to claim 1, wherein a separation between said data layers is set to a distance which minimizes crosstalk between the respective data layers.

20. An optical medium according to claim 19, wherein said separation comprises at least one of approximately 10 μm and 15 μm for coherent illumination and comprises at least one of approximately 10 μm and 12.5 μm for incoherent illumination.

21. An optical medium comprising:
a plurality of data layers stacked relative to each other in a dielectric medium;
a respective data layer including mark and land regions for having information recorded thereon;
land materials comprising land regions of the respective data layers having substantially the same reflectivity; and
mark materials comprising the mark regions of the respective data layers having substantially the same reflectivity.

22. An optical medium according to claim 21, comprising at least 5 of the data layers.

23. An optical medium according to claim 21, comprising at least 20 of the data layers.

24. An optical medium according to claim 21, comprising at least 40 of the data layers.

25. An optical medium according to claim 21, wherein said respective data layer has a reflectivity of at least 5%.

26. An optical medium according to claim 21, wherein said respective data layer has a reflectivity of at least 10%.

27. An optical medium according to claim 21, wherein said respective data layer has a reflectivity of at least 15%.

28. An optical medium according to claim 21, wherein a separation between said data layers is set to a distance which minimizes crosstalk between the respective data layers.

29. An optical medium according to claim 28, wherein said separation comprises at least one of approximately 10 μm and 15 μm for coherent illumination and comprises at least one of approximately 10 μm and 12.5 μm for incoherent illumination.

30. An optical medium comprising:
a plurality of data layers stacked relative to each other in a dielectric medium;
a respective data layer having mark and land regions for having information recorded thereon; and
at least one of the mark and land regions comprising a material that exhibits an admittance curve that intersects a desired admittance curve for minimizing crosstalk between said plurality of data layers,
wherein a thickness of the material is determined by an intersection of the admittance curve of the material and the desired admittance curve.

31. An optical medium according to claim 30, wherein the desired admittance curve satisfies a condition of $$Y_{MD} = \frac{(1+\beta e^{i\phi})Y_L + (1-\beta e^{i\phi})n_0}{(1-\beta e^{i\phi})Y_L + (1+\beta e^{i\phi})n_0} \cdot n_0$$

where $Y_L$ is the admittance of one of the land regions besides said one of the mark regions, $\beta$ is a scaling parameter ratio of mark reflection to land reflection, $\phi$ is total phase of a mark in reflection compared to that of a land, and $n_0$ is the refractive index of the dielectric medium.

32. An optical medium according to claim 31, wherein said data layers have a spacing between data layers of 10 μm, $\beta$ is 0.7 and $\phi$ is 60° in order to minimize crosstalk between the respective layers.

33. An optical medium according to claim 30, wherein each data layer includes at least two sub-layers.

34. An optical medium according to claim 33, wherein one sub-layer includes indium tin oxide and another sub-layer includes silver.

35. An optical medium according to claim 30, wherein a separation between said data layers is set to a distance which minimizes crosstalk between the respective data layers.

36. An optical medium according to claim 35, wherein said separation comprises at least one of approximately 10 μm and 15 μm for coherent illumination and comprises at least one of approximately 10 μm and 12.5 μm for incoherent illumination.

37. A method of determining a composition of a data layer for an optical medium that includes a plurality of data layers stacked relative to each other in a dielectric medium; a respective data layer including mark and land regions for having information recorded thereon; wherein the plurality of data layers have substantially the same reflectivity, the method comprising:
  determining whether an admittance curve for a material to be used as the mark region forms an intersection with a desired admittance curve based on an admittance of a land region disposed beside the mark region; and
  determining a thickness of the material based on the intersection.

38. A method of claim 37, wherein the desired admittance curve satisfies a condition of $$Y_{MD} = \frac{(1+\beta e^{i\phi})Y_L + (1-\beta e^{i\phi})n_0}{(1-\beta e^{i\phi})Y_L + (1+\beta e^{i\phi})n_0} \cdot n_0$$

where $Y_L$ is the admittance of one of the land regions besides said one of the mark regions,
$\beta$ is a scaling parameter ratio of mark reflection to land reflection,
$\phi$ is total phase of a mark in reflection compared to that of a land, and
$n_0$ is the refractive index of the dielectric medium.

39. A computer-readable storage medium for storing therein a computer program that includes instructions which when executed on a computer causes the computer to execute a method of determining a composition of a data layer for an optical medium that includes a plurality of data layers stacked relative to each other in a dielectric medium; a respective data layer including mark and land regions for having information recorded thereon; wherein the plurality of data layers have substantially the same reflectivity, the instructions comprising:
  a first computer program code configured to determine whether an admittance curve for a material to be used as the mark region forms an intersection with a desired admittance curve based on an admittance of a land region disposed beside the mark region; and
  a second computer program code configured to determine a thickness of the material based on the intersection.

40. A computer-readable storage medium of claim 39, wherein the desired admittance curve satisfies a condition of $$Y_{MD} = \frac{(1+\beta e^{i\phi})Y_L + (1-\beta e^{i\phi})n_0}{(1-\beta e^{i\phi})Y_L + (1+\beta e^{i\phi})n_0} \cdot n_0$$

where $Y_L$ is the admittance of one of the land regions besides said one of the mark regions,
$\beta$ is a scaling parameter ratio of mark reflection to land reflection, and
$\phi$ is total phase of a mark in reflection compared to that of a land, and
$n_0$ is the refractive index of the dielectric medium.

41. An optical data processing system comprising:
an optical medium including,
  a plurality of data layers stacked relative to each other in a dielectric medium;
  a respective data layer including mark and land regions for having information recorded thereon; and
  said mark and land regions disposed beside each other, and having substantially the same optical path length across respective thicknesses of said mark and land regions; and
an optical read/write head configured to read or write said optical medium.

42. An optical data processing system comprising:
an optical medium including,
  a plurality of data layers stacked relative to each other in a dielectric medium,
  a respective data layer including mark and land regions for having information recorded thereon,
  land materials comprising land regions of the respective data layers having substantially the same reflectivity, and
  mark materials comprising the mark regions of the respective data layers having substantially the same reflectivity; and
an optical read/write head configured to read or write said optical medium.

43. An optical medium comprising:
a plurality of data layers stacked relative to each other in a dielectric medium;
a respective data layer including mark and land regions for having information recorded thereon;
a first group of plural data layers from the plurality of data layers having a first reflectivity; and
a second group of plural data layers from the plurality of data layers having a second reflectivity different from the first reflectivity.

44. An optical medium according to claim 43, further comprising:
additional groups of plural data layers having respective reflectivities different from each other.

* * * * *